(12) United States Patent
Desbiens et al.

(10) Patent No.: US 10,270,315 B2
(45) Date of Patent: Apr. 23, 2019

(54) CAST COOLING ARRANGEMENT FOR ELECTRIC MACHINES

(71) Applicant: TM4 Inc., Boucherville (CA)

(72) Inventors: Jean-Philippe Desbiens, Saint-Bruno de Montarville (CA); François Dubé, Montréal (CA); Danny Dupuis, Sainte-Julie (CA); Jean-Philippe Dextraze, Delson (CA); Éric Latulipe, Sainte-Julie (CA)

(73) Assignee: TM4 Inc., Boucherville, QC (CA)

( * ) Notice: Subject to any disclaimer, the term of this patent is extended or adjusted under 35 U.S.C. 154(b) by 0 days.

(21) Appl. No.: 15/752,760

(22) PCT Filed: Aug. 17, 2016

(86) PCT No.: PCT/CA2016/050966
§ 371 (c)(1),
(2) Date: Feb. 14, 2018

(87) PCT Pub. No.: WO2017/027972
PCT Pub. Date: Feb. 23, 2017

(65) Prior Publication Data
US 2018/0241289 A1     Aug. 23, 2018

Related U.S. Application Data

(60) Provisional application No. 62/207,254, filed on Aug. 19, 2015.

(51) Int. Cl.
*H02K 9/22* (2006.01)
*H02K 1/18* (2006.01)
(Continued)

(52) U.S. Cl.
CPC ............... *H02K 9/22* (2013.01); *H02K 1/187* (2013.01); *H02K 5/20* (2013.01); *H02K 9/19* (2013.01)

(58) Field of Classification Search
CPC ............ H02K 9/22; H02K 1/187; H02K 5/20; H02K 9/19
(Continued)

(56) References Cited

U.S. PATENT DOCUMENTS 4,854,034 A * 8/1989 Archibald ............ H02K 15/024
29/596
5,859,482 A    1/1999 Crowell et al.
(Continued)

FOREIGN PATENT DOCUMENTS

WO    WO 2009146869 A2 * 12/2009 ............... H02K 5/20
WO    WO-2013170350 A1 * 11/2013 ............... H02K 1/20

OTHER PUBLICATIONS

PCT International Search Report of International Searching Authority for International Patent Application No. PCT/CA2016/050966, dated Oct. 26, 2016, 3 pages.
(Continued)

*Primary Examiner* — Alex W Mok
(74) *Attorney, Agent, or Firm* — Marshall & Melhorn, LLC

(57) ABSTRACT

A cooling arrangement cast into a generally cylindrical stator having longitudinal channels provided on an internal surface thereof is described herein. The cast cooling arrangement comprising a cast heat-storing element and conduits defining a cooling path having an inlet and an outlet.

30 Claims, 27 Drawing Sheets

(51) Int. Cl.
*H02K 5/20* (2006.01)
*H02K 9/19* (2006.01)

(58) Field of Classification Search
USPC .......................................................... 310/52
See application file for complete search history.

(56) References Cited

U.S. PATENT DOCUMENTS

| | | | | |
|---|---|---|---|---|
| 6,300,693 | B1 | 10/2001 | Poag et al. | |
| 6,836,036 | B2* | 12/2004 | Dube .................... | H02K 1/148 180/65.51 |
| 7,595,578 | B2* | 9/2009 | Aramaki ................ | H02K 1/148 29/603.01 |
| 7,608,969 | B2* | 10/2009 | Suzuki .................. | H02K 3/487 310/214 |
| 8,354,763 | B2* | 1/2013 | Hashiba ................ | H02K 1/20 310/54 |
| 8,405,262 | B1 | 3/2013 | Beatty et al. | |
| 2004/0012272 | A1* | 1/2004 | Houle .................... | H02K 1/20 310/54 |
| 2004/0160141 | A1* | 8/2004 | Dube .................... | H02K 1/148 310/216.028 |
| 2005/0116553 | A1* | 6/2005 | Poulin .................... | H02K 9/19 310/54 |
| 2007/0267932 | A1* | 11/2007 | Ashikawa ............. | H02K 1/148 310/216.001 |
| 2008/0018181 | A1* | 1/2008 | Neal ....................... | H02K 9/20 310/54 |
| 2009/0066183 | A1* | 3/2009 | Aramaki ................ | H02K 1/148 310/216.008 |
| 2009/0115268 | A1* | 5/2009 | Fleming ................. | H02K 9/22 310/52 |
| 2010/0176669 | A1* | 7/2010 | Houle .................... | H02K 5/20 310/54 |
| 2011/0278968 | A1* | 11/2011 | Houle .................... | H02K 1/20 310/54 |
| 2013/0154434 | A1* | 6/2013 | Hasegawa ............. | H02K 1/16 310/216.004 |
| 2014/0009013 | A1* | 1/2014 | Chamberlin ........... | H02K 9/19 310/54 |
| 2014/0015349 | A1* | 1/2014 | Chamberlin ........... | H02K 3/345 310/43 |
| 2015/0028728 | A1* | 1/2015 | Carpentier ............. | H02K 9/19 310/60 A |

OTHER PUBLICATIONS

PCT Written Opinion of International Searching Authority for International Patent Application No. PCT/CA2016/050966, dated Oct. 26, 2016, 4 pages.

* cited by examiner

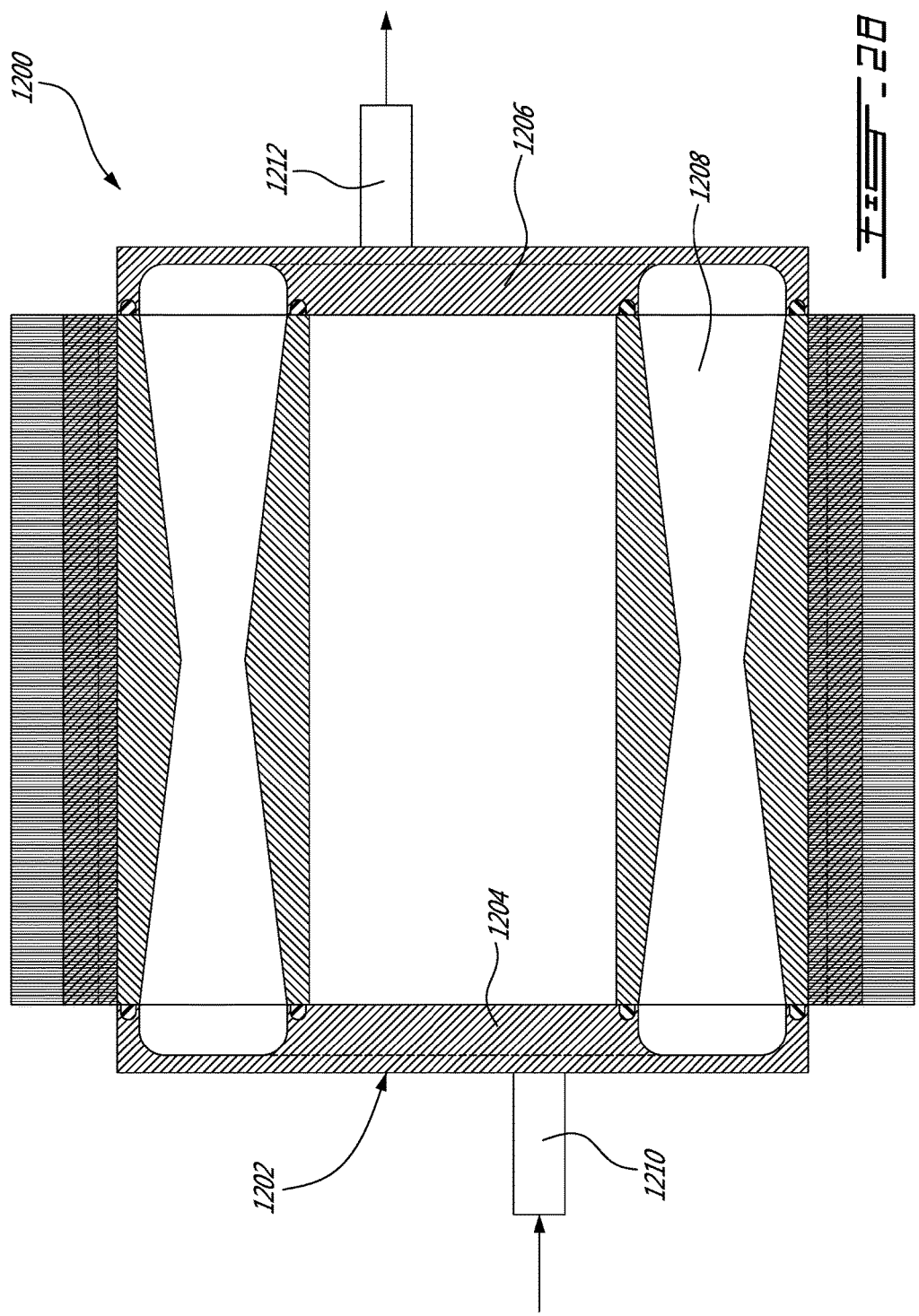

US 10,270,315 B2

CAST COOLING ARRANGEMENT FOR ELECTRIC MACHINES

CROSS REFERENCE TO RELATED APPLICATIONS

This application is a national phase under 35 U.S.C. § 371 of International Application No. PCT/CA2016/050966 filed on Aug. 17, 2016, which claims priority to and benefit of U.S. Provisional Ser. No. 62/207,254 filed on Aug. 19, 2015, and the entirety of each of these applications is incorporated by reference herein.

FIELD

The present disclosure relates to electric machines. More specifically, the present disclosure is concerned with a cast cooling arrangement for electric machines and with electric machines provided with such a cast cooling arrangement.

BACKGROUND

Electric machines, motors or generators, are well known in the art. It is also widely known that electric machines generate heat as a by-product and that this heat must be somehow extracted from the machine to improve the performance of the machine and/or prevent early degradation or failure thereof.

Electric machines are often air-cooled. This is generally done by providing apertures in the body of the machine to force air therethrough. The efficiency of such a cooling arrangement is generally poor since air is a generally low efficiency cooling fluid. Furthermore, some electric machines operate in environments that are such that it is not possible to provide apertures to allow air therein. Accordingly, fluid cooling arrangements for electric machines have also been designed.

Some permanent magnet electric machines are provided with an internal stator and an external rotor generally enclosing the stator. When this is the case, the stator has a generally cylindrical body and coils are so mounted to the cylindrical body as to outwardly produce a magnetic field that interacts with the externally provided rotor. Since the heat is generally generated in the stator that is somewhat enclosed by the rotor, it may be difficult to install a fluid cooling arrangement inside an enclosed stator of such an external rotor electric machine.

BRIEF DESCRIPTION OF THE DRAWINGS

In the appended drawings:

FIG. 28 is a sectional view similar to FIG. 23 but illustrating a thirteenth illustrative embodiment.

DETAILED DESCRIPTION

Figure 1:
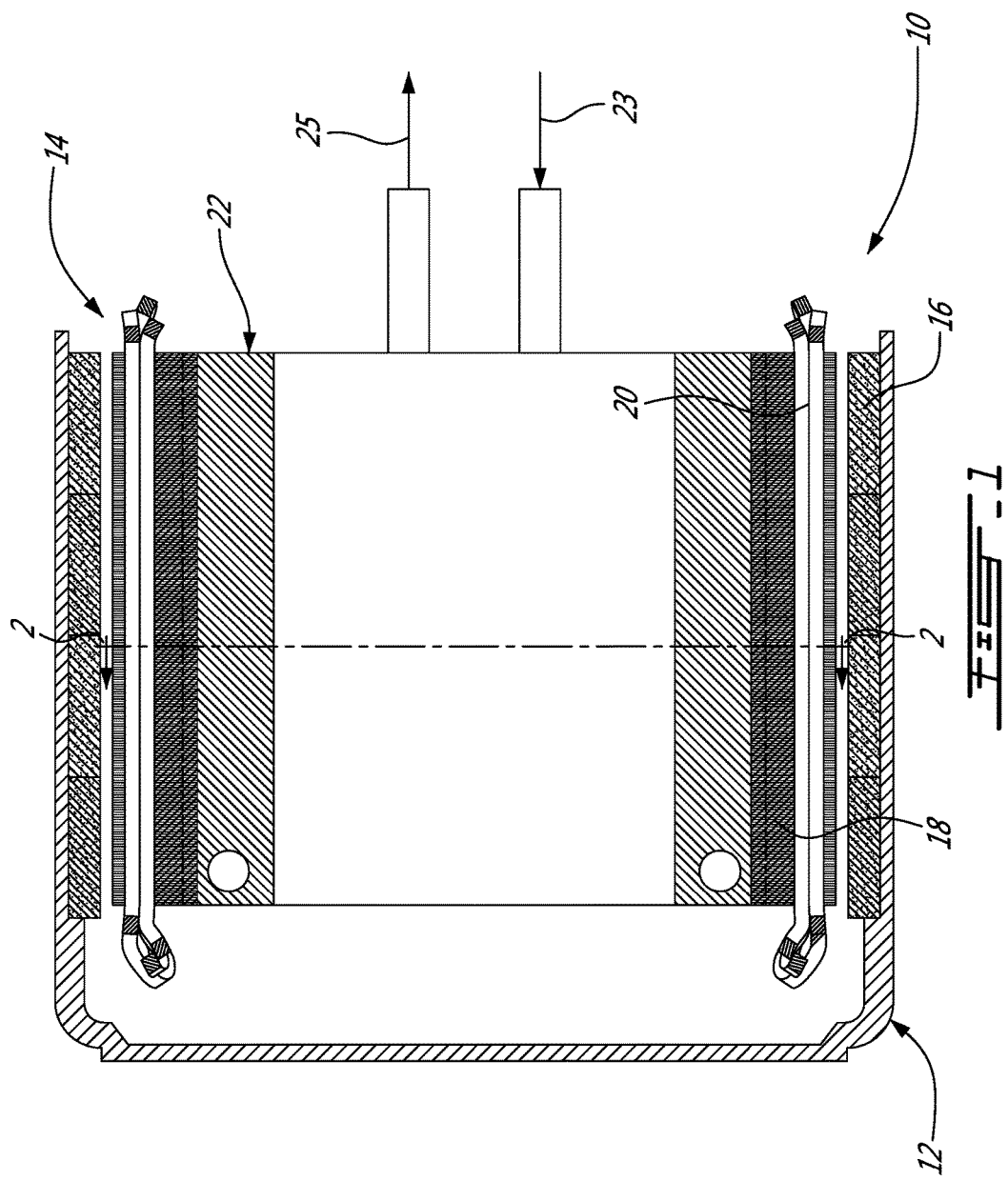
FIG. 1 is a sectional view of an electric machine provided with a cast cooling arrangement according to a first illustrative embodiment.

In accordance with an illustrative embodiment, there is provided a cooling arrangement cast into a generally cylindrical stator having longitudinal channels provided on an internal surface thereof; the cast cooling arrangement comprising a cast heat-storing element and conduits defining a cooling path having an inlet and an outlet.

According to another aspect, there is provided an electric machine comprising an internal stator having an internal surface provided with longitudinal channels; an external rotor coaxially mounted about the internal stator and a liquid cooling arrangement cast in the internal stator, the liquid cooling arrangement comprising a cast heat-storing element and conduits defining a cooling path having an inlet and an outlet.

According to a third aspect, there is provided a method of forming a stator provided with a cast cooling arrangement comprising: providing a generally cylindrical stator core having an internal surface provided with longitudinal channels; placing the stator core into a mold having an internal wall and a bottom wall; the mold defining a chamber between the internal wall, the bottom wall and the internal surface of the generally cylindrical stator core; providing a cooling conduit; placing the cooling conduit in the chamber; and casting a heat-conducting material into the chamber.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

In the present specification and in the appended claims, various terminology which is directional, geometrical and/or spatial in nature such as "longitudinal", "horizontal", "front", rear", "upwardly", "downwardly", etc. is used. It is to be understood that such terminology is used for ease of description and in a relative sense only and is not to be taken in any way as a limitation upon the scope of the present disclosure.

Further, in this specification, the terms "axial direction", "axially", "axial", and the like, refer to the direction of the rotation axis of the rotor, the direction of the central axis of the cylindrical stator, and the directions corresponding to them, the terms "radial direction", "radially", "radial", and the like, refer to the directions perpendicular to such axial directions, and the terms "circumferential direction", "circumferentially", "circumferential", and the like, refer to each direction along the circumference of a circle drawn about a given point of the rotation axis on a plane perpendicular to the rotation axis.

The expression "connected" should be construed herein and in the appended claims broadly so as to include any cooperative or passive association between mechanical parts or components. For example, such parts may be assembled together by direct connection, or indirectly connected using further parts therebetween. The connection can also be remote, using for example a magnetic field or else.

It is to be noted that the expression "electric machine" is to be construed herein as encompassing both electric motors and electric generators disregarding the technology used in these machines.

The term "about" is used to indicate that a value includes an inherent variation of error for the device or the method being employed to determine the value.

Other objects, advantages and features will become more apparent upon reading of the following non-restrictive description of illustrative embodiments thereof, given by way of example only with reference to the accompanying drawings.

Generally stated, cast cooling arrangements according to illustrative embodiments are designed to be cast directly into a stator core, made for example of stacked laminations. The cast cooling arrangements described herein include a heat-storing element enclosing conduits defining a cooling path allowing cooling fluid to flow therethrough to remove heat from the heat-storing element, and thereby cool the electric machine. To provide an adequate contact between the cooling arrangement and the stator core, the stator core is provided with multiple longitudinal internal channels that are filled during the casting process. The channels are so shaped that an adequate contact is maintained even during unequal dilatation and/or contraction of the cooling arrangement and of the stator caused by heat.

FIG. 1 of the appended drawings illustrates an electric machine 10 provided with an external rotor 12 and an internal stator 14. The external rotor 12 is provided with permanent magnets 16 facing the internal stator 14. The internal stator 14 includes a stator core 18, coils 20 and a cast cooling arrangement 22 provided with a cooling path having an inlet 23 and an outlet 25.

Figure 2:
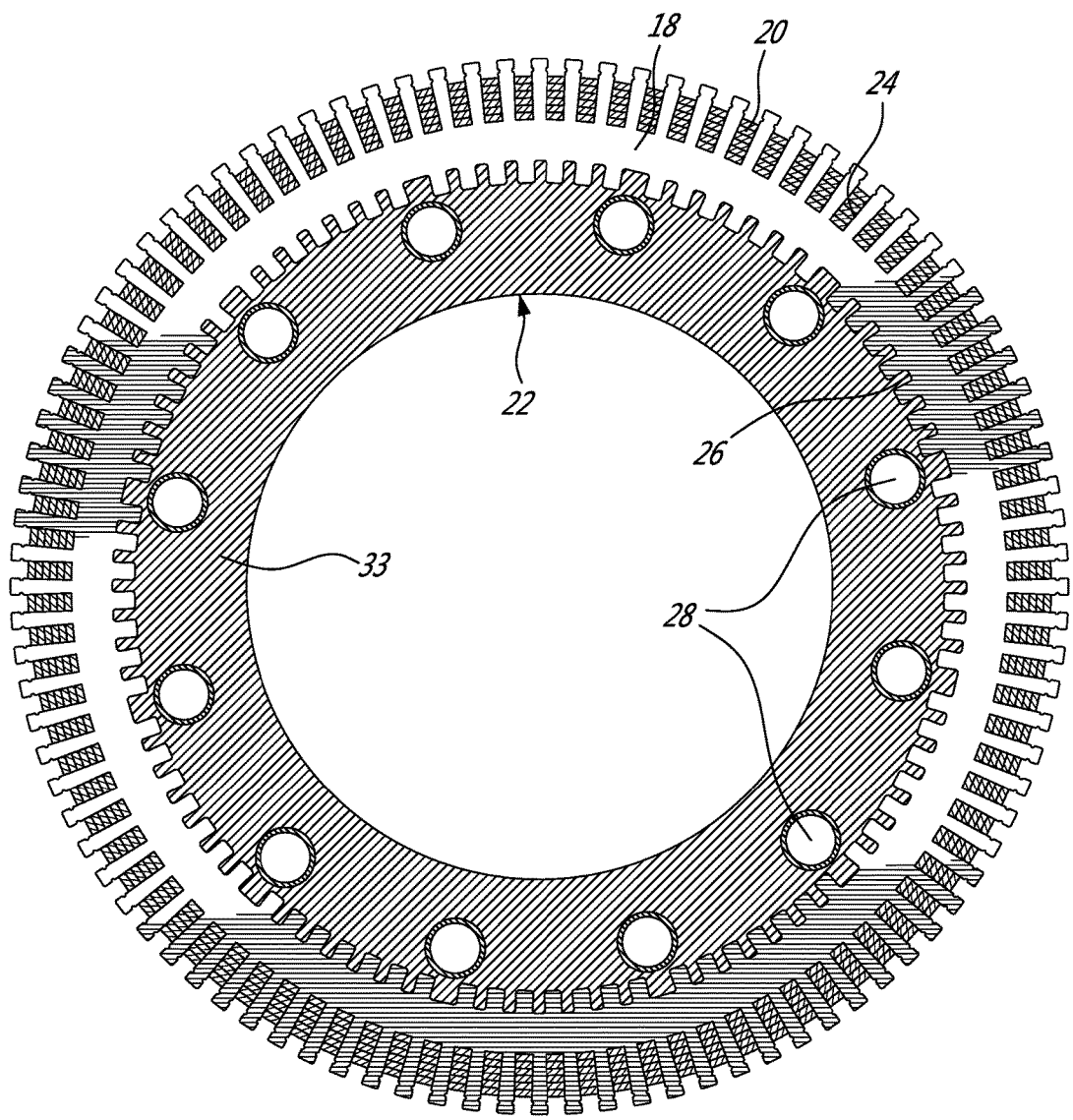
FIG. 2 is a sectional view taken along line 2-2 of FIG. 1.

FIG. 2, which is a sectional view taken along line 2-2 of FIG. 1, illustrates the stator core 18 and the internally cast cooling arrangement 22. As can be seen from this figure, the stator core 18 is provided with externally facing longitudinal channels 24 so configured and sized as to receive the coils 20 therein and with internally facing longitudinal channels 26 into which a portion of the heat-storing element 33 of the cooling arrangement 22 is cast, as will be described hereinbelow.

Figure 3:
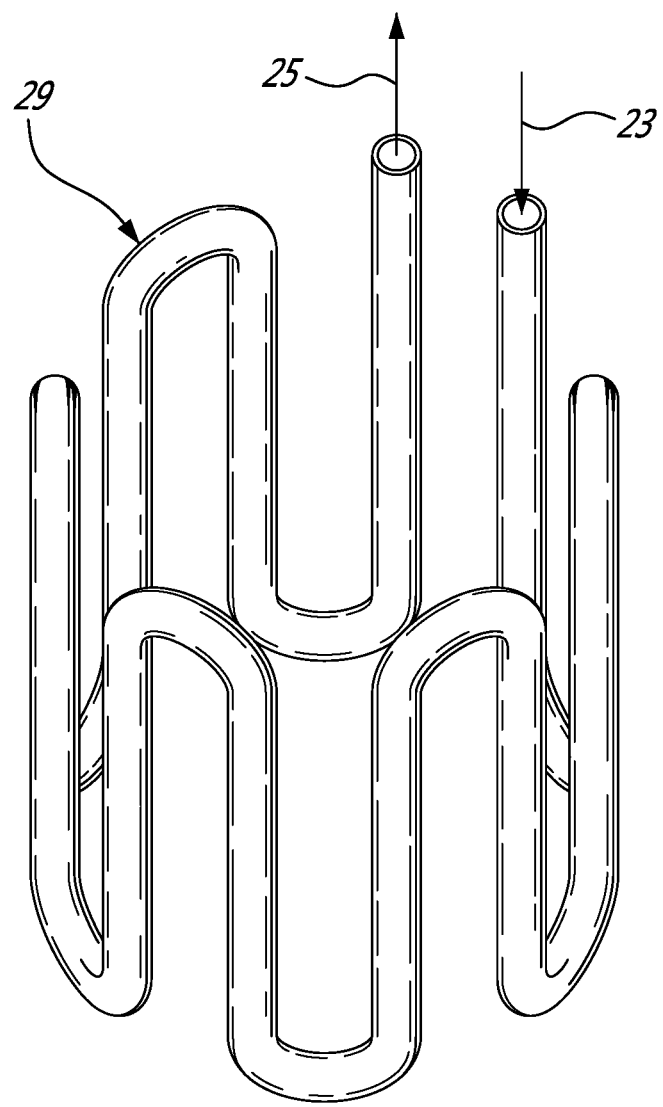
FIG. 3 is a perspective view of a continuous cooling tube to be embedded in the cast heat-storing element of the cooling arrangement.

The cast cooling arrangement 22 includes a cooling path defined by a plurality of conduits 28 embedded in the heat-storing element 33 to allow cooling fluid (not shown) to flow therein to thereby remove heat from the heat-storing element 33 and therefore to cool the electric machine. In this illustrated embodiment, the plurality of conduits 28 are integral and are arranged in a serpentine cooling tube 29 provided with the inlet 23 and outlet 25 as illustrated in FIG. 3.

Figure 4:
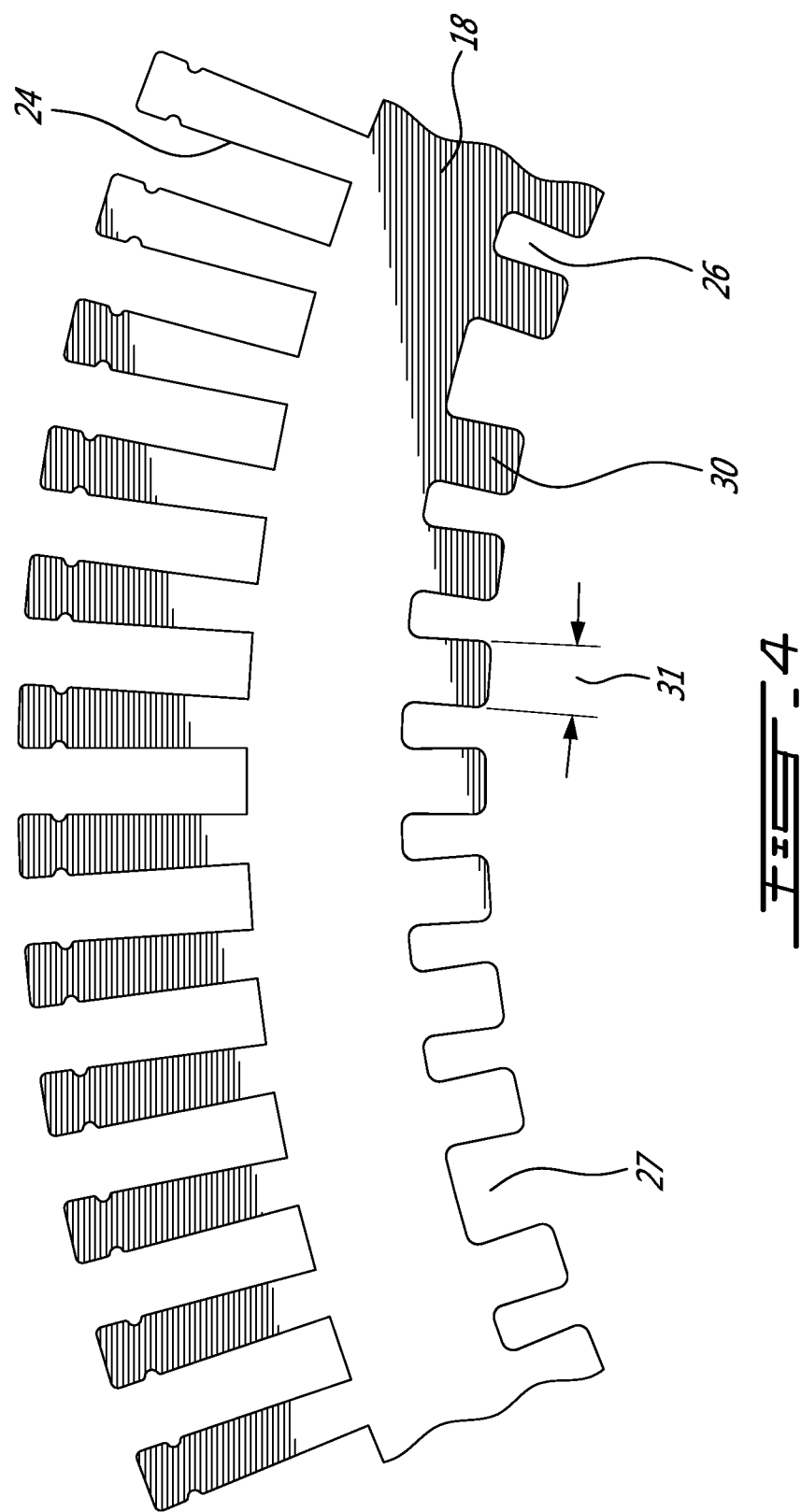
FIG. 4 is a top plan view of a portion of the stator core of the electric machine of FIG. 1.

FIG. 4 illustrates a portion of the stator core before the casting of the heat-storing element 33 and the installation of the coils therein. As can be seen from this figure, the internally facing longitudinal channels 26 define inwardly facing teeth 30. Furthermore, the sidewalls of the channels 26 are not radial but are slightly tapered so that the channels widen outwardly to create a wedge shape channel. In other words, the longitudinal channels 26 are generally dovetail shaped. For example an angle 31 of about two (2) degrees can be provided. The purpose of this wedge shape will be described hereinbelow.

As shown in FIG. 4, wider longitudinal channels 27 are also provided. As can be seen form FIG. 5, the purpose of these wider channels 27 is to ensure a minimal distance between the teeth 30 and the serpentine cooling tube 29 to allow the adequate casting of the heat-storing element 33.

One skilled in the art will understand that the stator core 18 can be made of a stack of laminations that have been cut using stamping or other processes.

Turning to FIGS. 4 to 7 of the appended drawings, the fabrication and assembly of a stator provided with a cast cooling arrangement according to an illustrative embodiment will be described. For clarity purpose, only a portion of the stator will be illustrated.

As mentioned hereinabove, FIG. 4 illustrates the stator core 18 before the casting of the heat-storing element 33 and the mounting of the coils 20 thereto.

Figure 5:
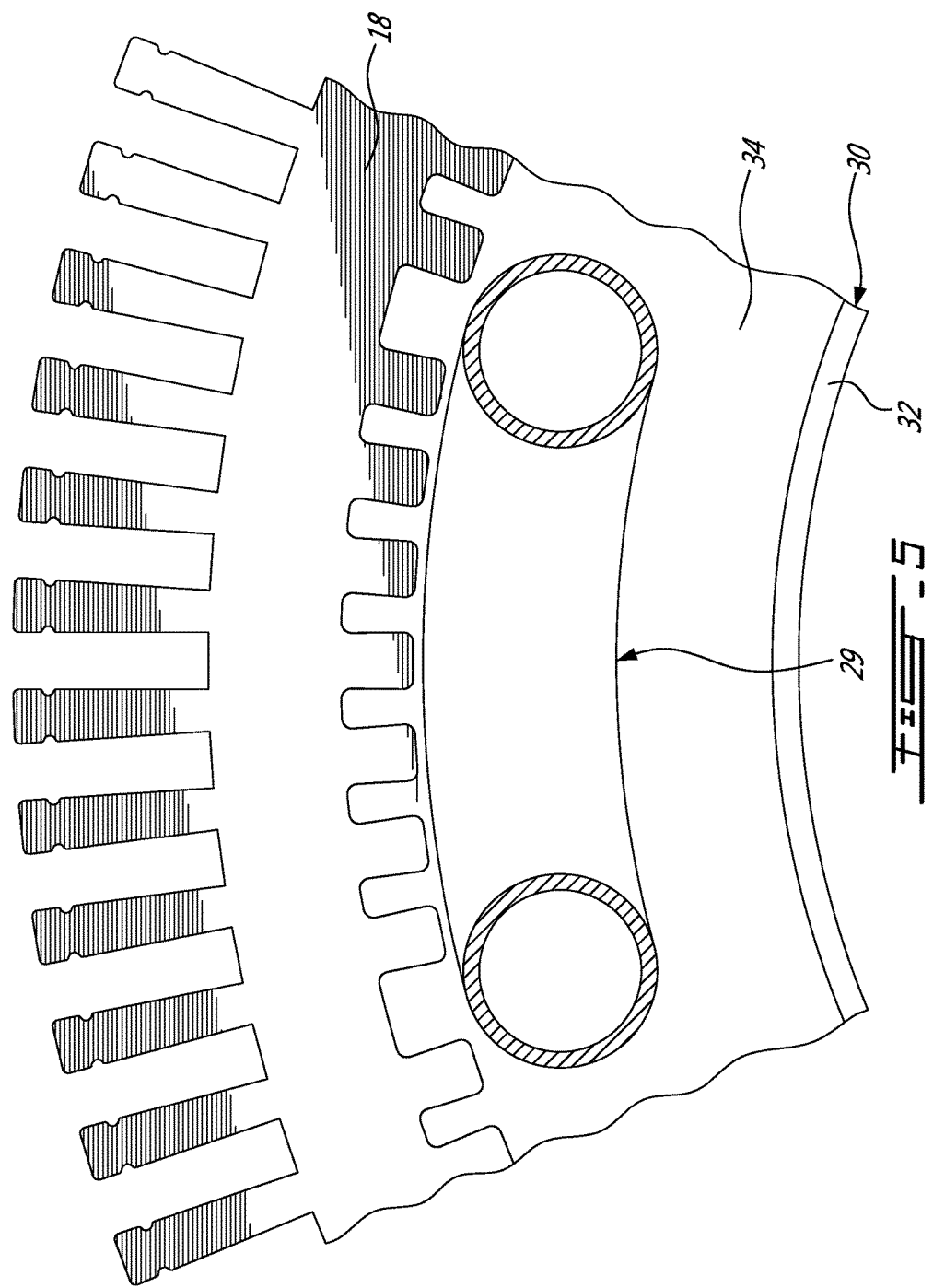
FIG. 5 is a top plan view of the stator core and the continuous cooling tube mounted in a mold.

In FIG. 5, the stator core 18 and the serpentine cooling tube 29 have been inserted in a mold 30 including an inner wall 32 and a bottom wall 34. The stator core 18 is so mounted to the bottom wall 34 as to provide an adequate seal therebetween. It is then possible to let the material forming the cast heat-storing element 33 to flow in the mold.

It is to be noted that while the serpentine cooling tube 29 is shown herein as having a curvature that generally follows the inner radius of the stator core 18, this is not a requirement and that these curved portions could be straight.

The material forming the heat-storing element 33 is a thermally conductive and castable material, such as aluminum and aluminum alloy. Other suitable materials such as copper, non-ferrous materials, heat-conducting polymers or any combination thereof can also be used.

Figure 6:
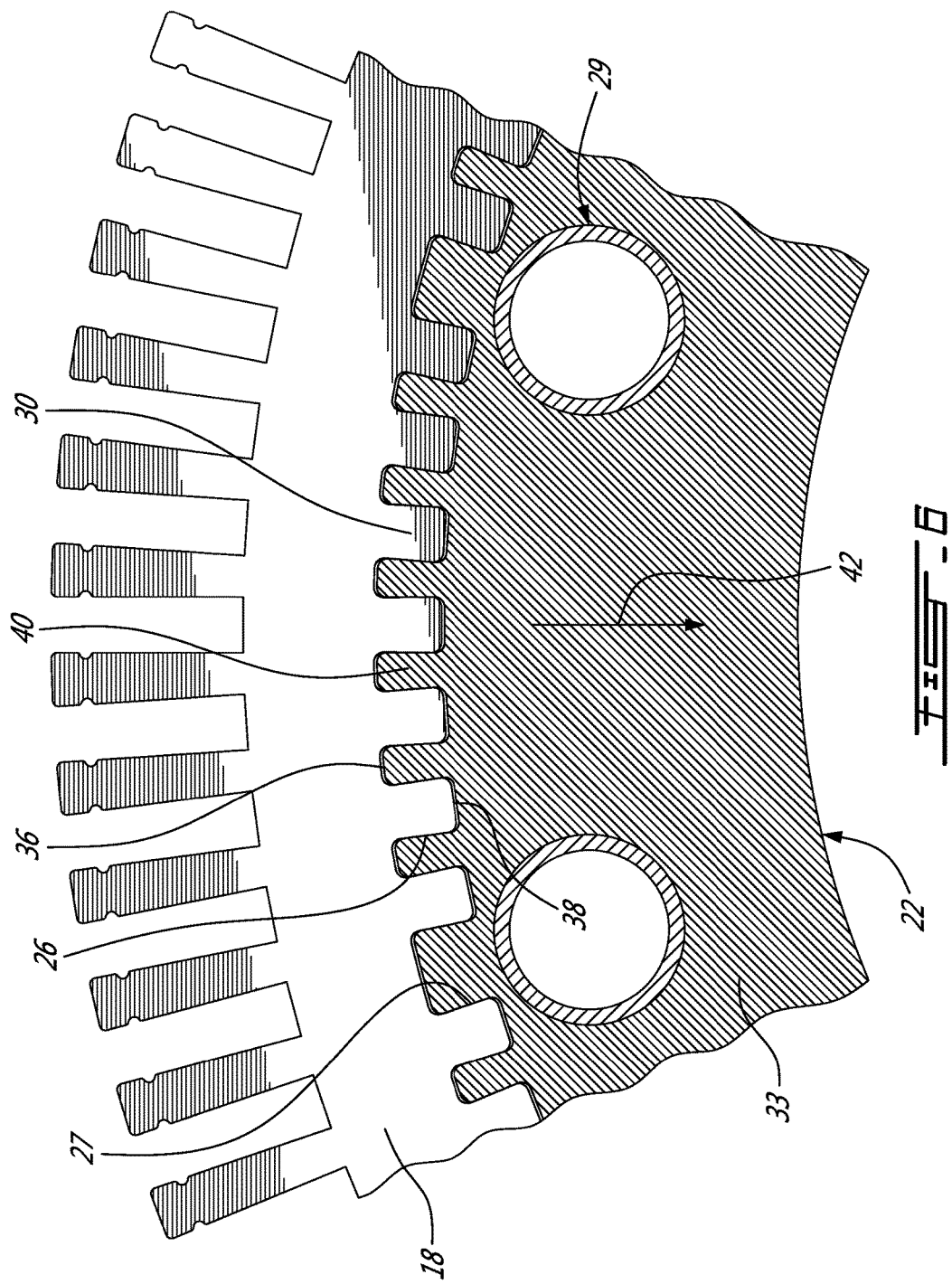
FIG. 6 is a top plan view of the stator core with the cast cooling arrangement.

FIG. 6 illustrates the stator core 18 and the cast cooling arrangement 22 including the serpentine cooling tube 29 and the heat-storing element 33 once the cast material forming the cast heat-storing element 33 has cooled.

As can be seen from this figure, the cast heat-storing element 33 of the cooling arrangement 22 has slightly contracted during cooling, thereby creating minute gaps 36 and 38 respectively between the bottom of the channels 26 and the top of the cast teeth 40 and between the end of the teeth 30 and the cooling arrangement 22. The size of these gaps 36 and 38, which are exaggerated in FIG. 6, depend on the size of the stator and of the material used, amongst others.

It is however to be noted that the angle of the side walls of the channels 26 ensures that during the contraction of the heat-storing element 33, an adequate mechanical contact for heat transfer is maintained between the cooling arrangement 22 and the stator core 18. Indeed, since the contraction of the heat-storing element 33 may be viewed as a pulling action of the heat-storing element 33 towards the center of the stator 18 (see arrow 42), the contact between the side walls of the cast teeth 40 and the side walls of the channels 26, 27 is maintained even though the width of the cast teeth 40 decreases slightly during the cooling of the casting.

Figure 7:
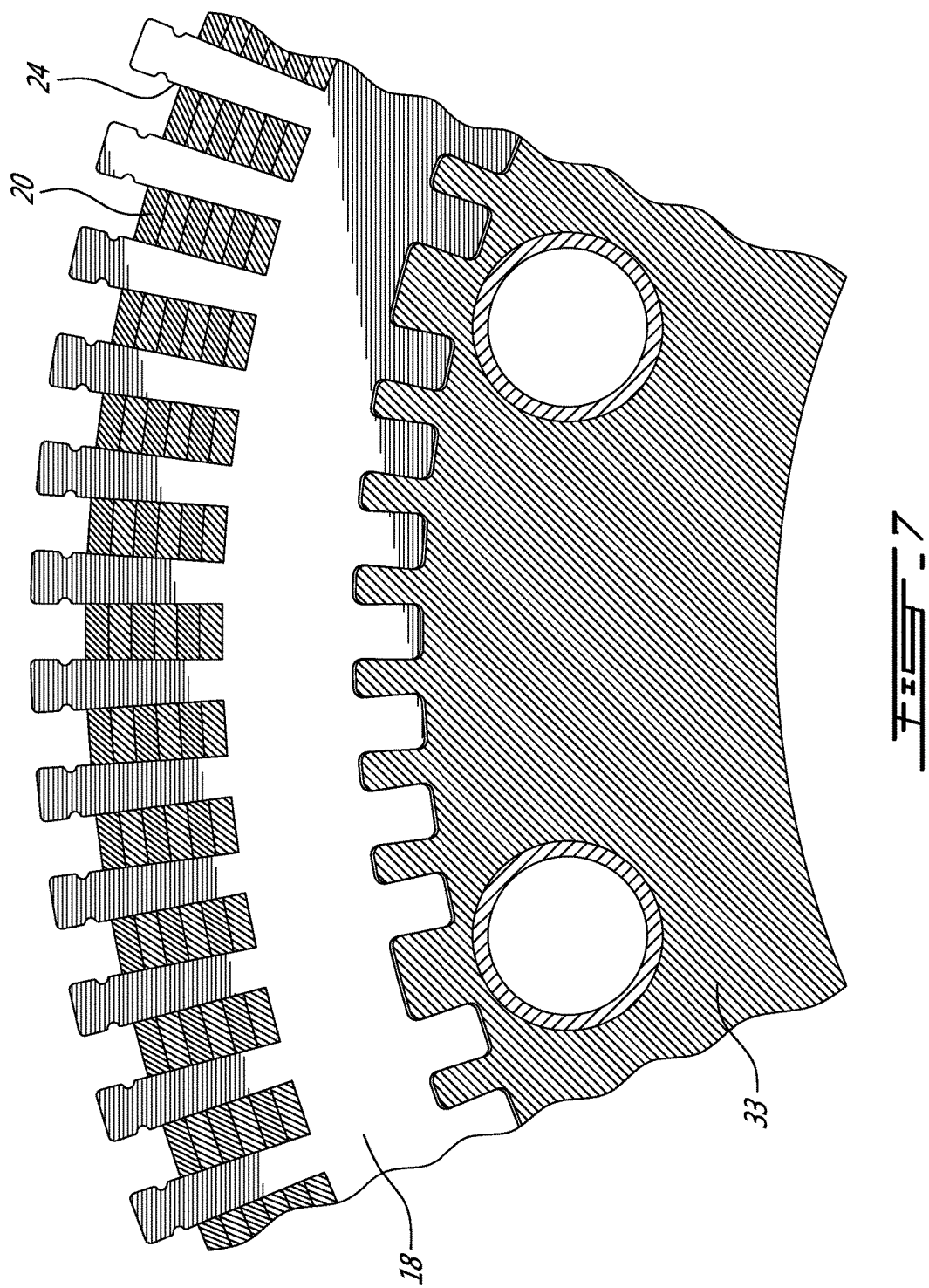
FIG. 7 is a top plan view of the completed stator.

FIG. 7 illustrates a complete stator once the coils 20 have been inserted in the channels 24.

One skilled in the art sill also understand that the adequate mechanical contact for heat transfer is maintained between the cast teeth 40 and the channels 26 and 27 during the various dilations and contractions of the stator core 18 and of the cooling arrangement 22 during use.

Figure 8:
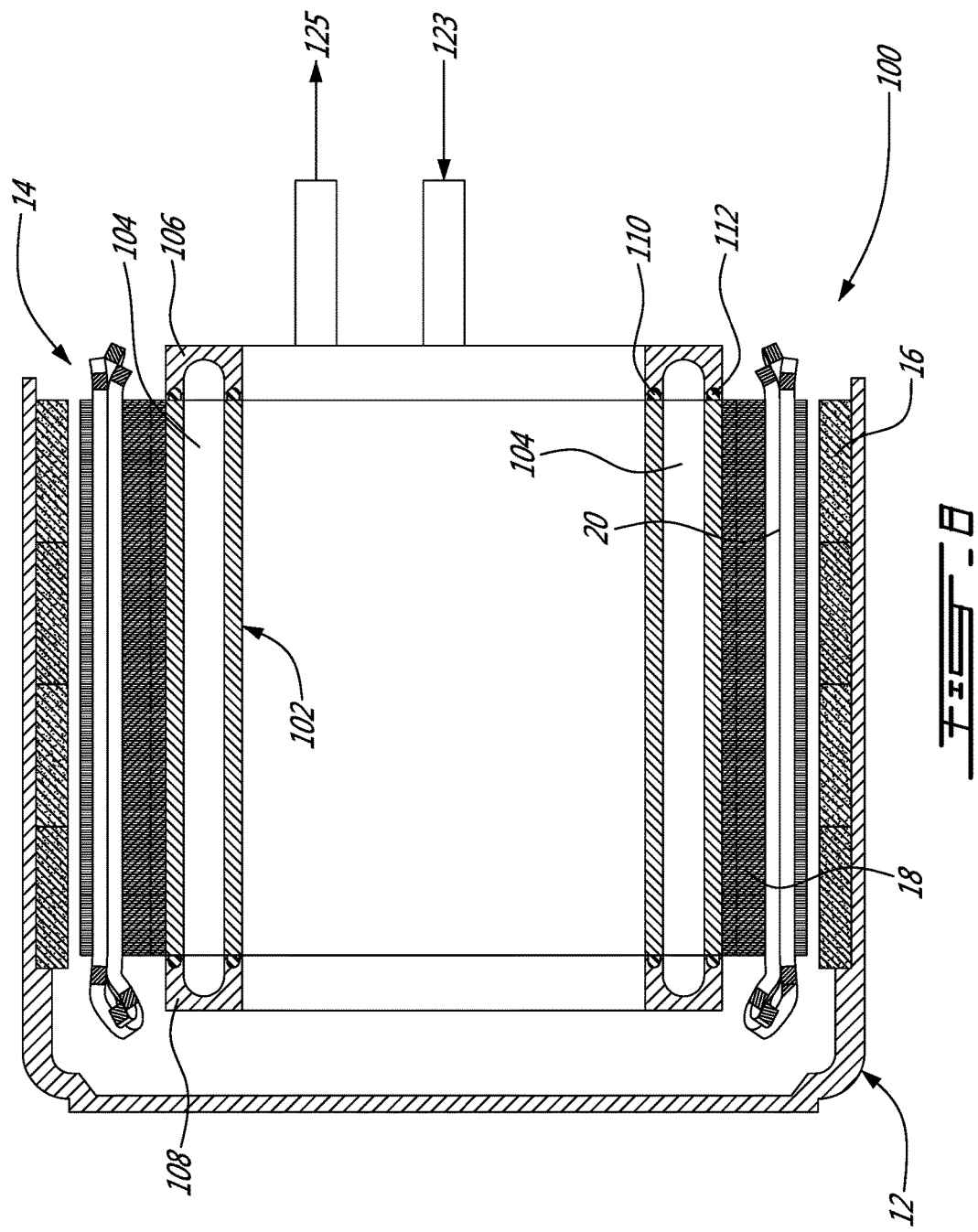
FIG. 8 is a sectional view similar to FIG. 1 but illustrating a second illustrative embodiment.

Turning now to FIG. 8 of the appended drawings, an electric machine 100 including a cast cooling arrangement 102 according to a second illustrative embodiment will be briefly described. Since the electric machine 100 and the electric machine 10 described hereinabove and illustrated in FIGS. 1 to 7 are very similar, only the differences therebetween will be described hereinbelow for concision purpose.

Generally stated, the main difference between the machines 100 and 10 relates to the cooling path through which the cooling fluid flows. Indeed, instead of having a continuous serpentine cooling tube 29 as shown in FIG. 3, the cooling path of the cooling arrangement 102 includes straight longitudinal tubes 104 and cooling arrangement covers 106 and 108 that are mounted at opposite free ends of the cast cooling arrangement 102 to interconnect adjacent tubes 104. O-rings 110 and 112 are provided to seal the interface between the covers and the cast arrangement. Of course fasteners (not shown) are used to removably fix the covers to the cast arrangement.

One skilled in the art is believed in position to design a mold suitable to produce such a cast cooling arrangement 102 and a mold suitable to provide the covers 106 and 108 that interconnect adjacent cooling tubes so as to yield a continuous cooling path between the fluid inlet 123 and the fluid outlet 125.

One skilled in the art will understand that the small gaps 36 and 38 may be filled by curable resin during the impregnation process conventionally taking place once the stator is completed.

It is also to be noted that while some of the longitudinal internal channels 26 shown herein are wider than others, this is not a requirement and all the channels could be identical as will be shown in following embodiments.

Figure 9:
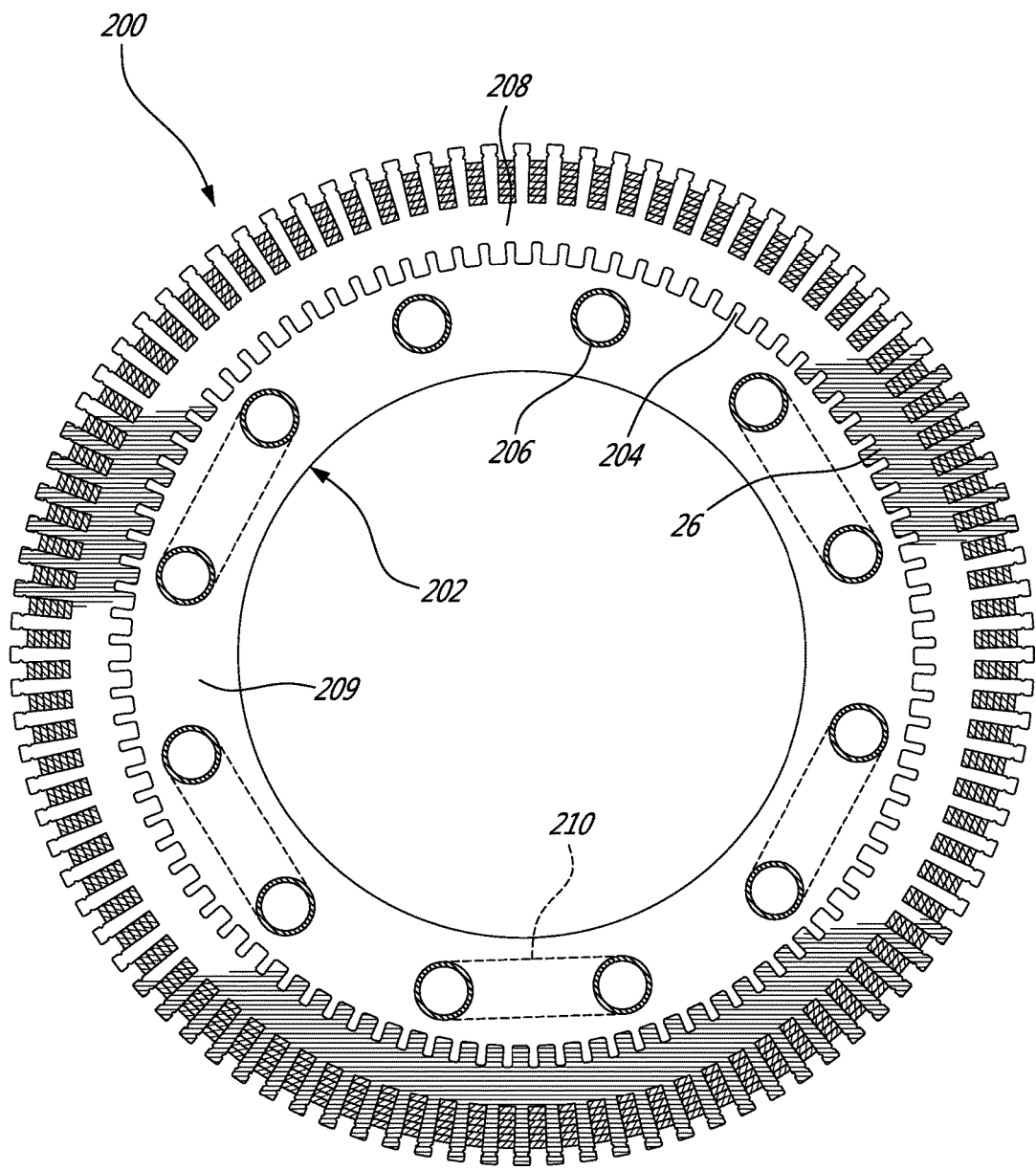
FIG. 9 is a sectional view similar to FIG. 2 but illustrating a third illustrative embodiment.

Turning now to FIG. 9 of the appended drawings, a stator 200 provided with a cast cooling arrangement 202 according to a third illustrative embodiment will now be described.

Since the stator 200 is similar to the stator 14 of the electric machine 10 described hereinabove and illustrated in FIGS. 1 to 7, only the differences therebetween will be described hereinbelow for concision purpose.

Generally stated, the main differences between the stator 200 of FIG. 9 and the stator 14 of FIG. 2 relate to the internally facing longitudinal channels 204 that are all identical and to the continuous serpentine cooling tube 206 that is positioned slightly inwardly farther stator core 208.

Since the distance between the stator core 208 and the cooling tube 206 is greater, it is no longer required to have larger channels to ensure a proper casting of the heat-storing element 209.

Furthermore, the serpentine cooling tube does not follow the stator core 208 but includes straight portions 210.

Figure 10:
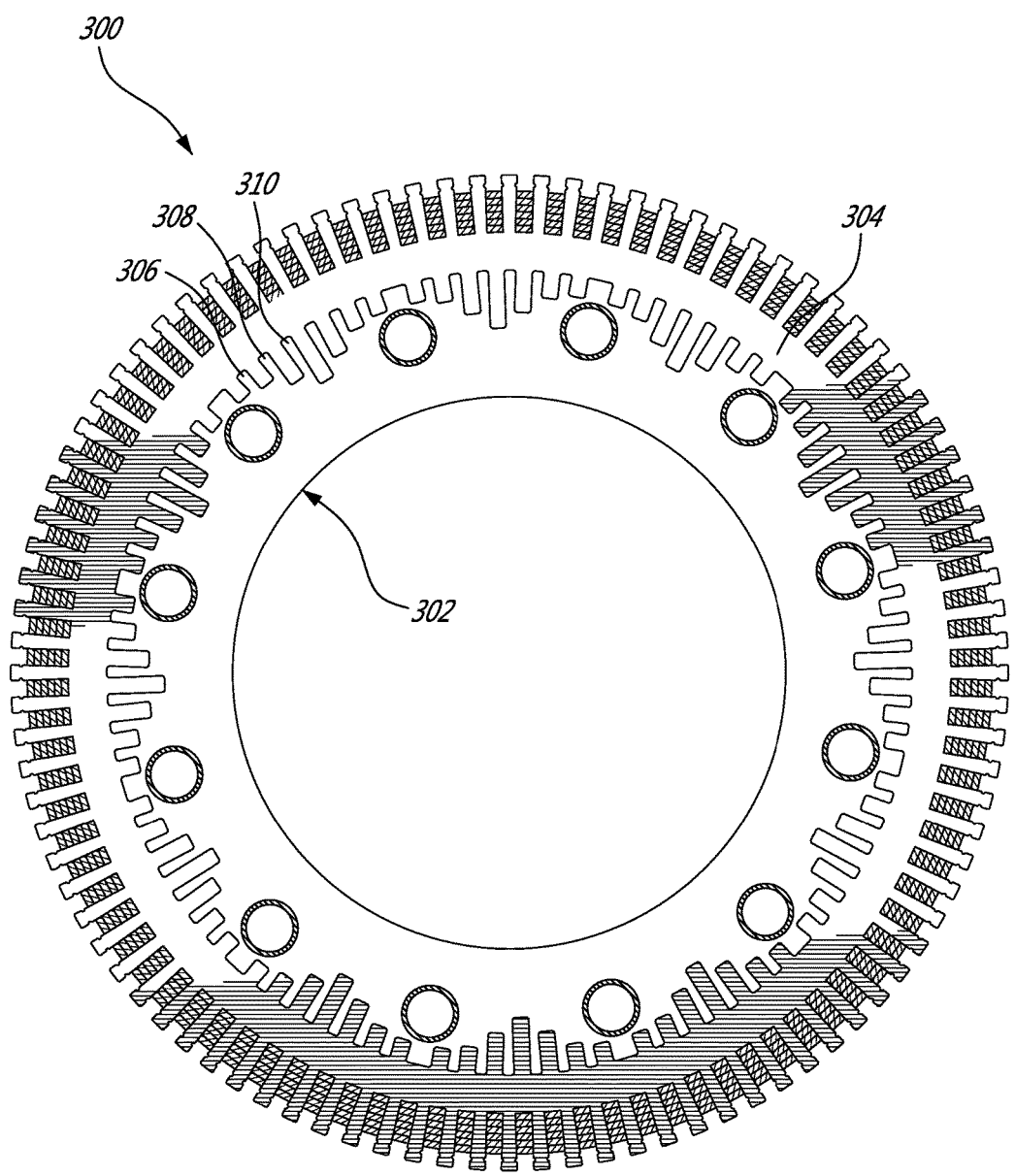
FIG. 10 is a sectional view similar to FIG. 2 but illustrating a fourth illustrative embodiment.

Turning now to FIG. 10 of the appended drawings, a stator 300 provided with a cast cooling arrangement 302 according to a fourth illustrative embodiment will now be described. Since the stator 300 is similar to the stator 14 of the electric machine 10 described hereinabove and illustrated in FIGS. 1 to 7, only the differences therebetween will be described hereinbelow for concision purpose.

FIG. 10 is a sectional view similar to FIG. 2 but illustrates a stator core 304 provided with internally facing longitudinal channels 306, 308 and 310 having different depth. It is therefore possible to increase the surface of the interface between the stator core 304 and the cast cooling arrangement 302 to improve heat transfer therebetween.

Turning now to FIGS. 11 to 14 of the appended drawings, a stator 400 provided with a machined cast cooling arrangement 402 according to a fifth illustrative embodiment will now be described. Since the stator 400 is similar to the stator 14 of the electric machine 10 described hereinabove and illustrated in FIGS. 1 to 7, only the differences therebetween will be described hereinbelow for concision purpose.

Generally stated, the main difference between the stator 400 and the stator 14 is that the cast cooling arrangement 402 is machined after it is cast in the stator core 404.

Figure 11:
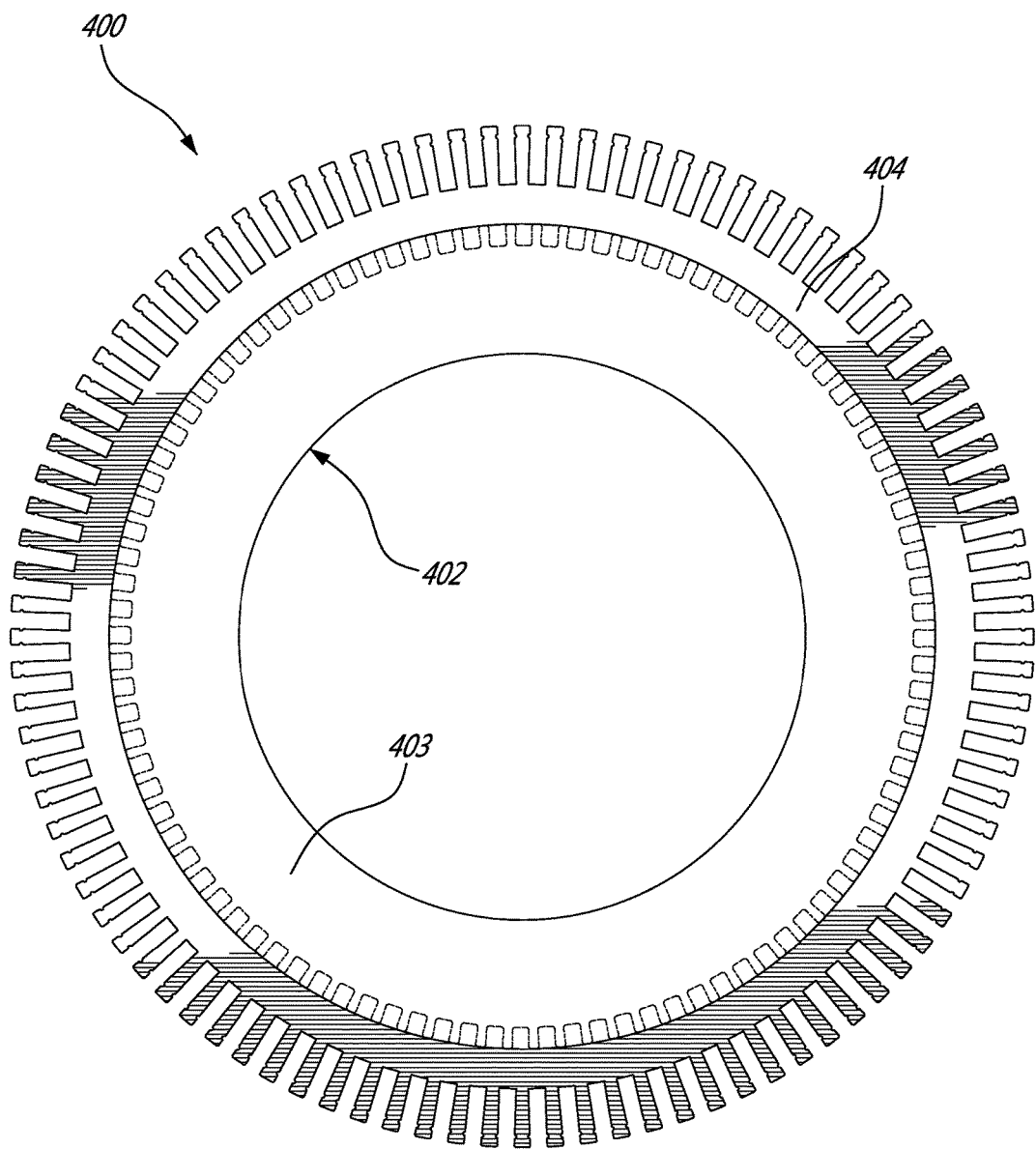
FIG. 11 is a top plan view of a stator including a cast cooling arrangement according to a fifth illustrative embodiment, before the machining operations.

FIG. 11 illustrates the stator 400 before the cast heat-storing element 403 is machined.

Figure 12:
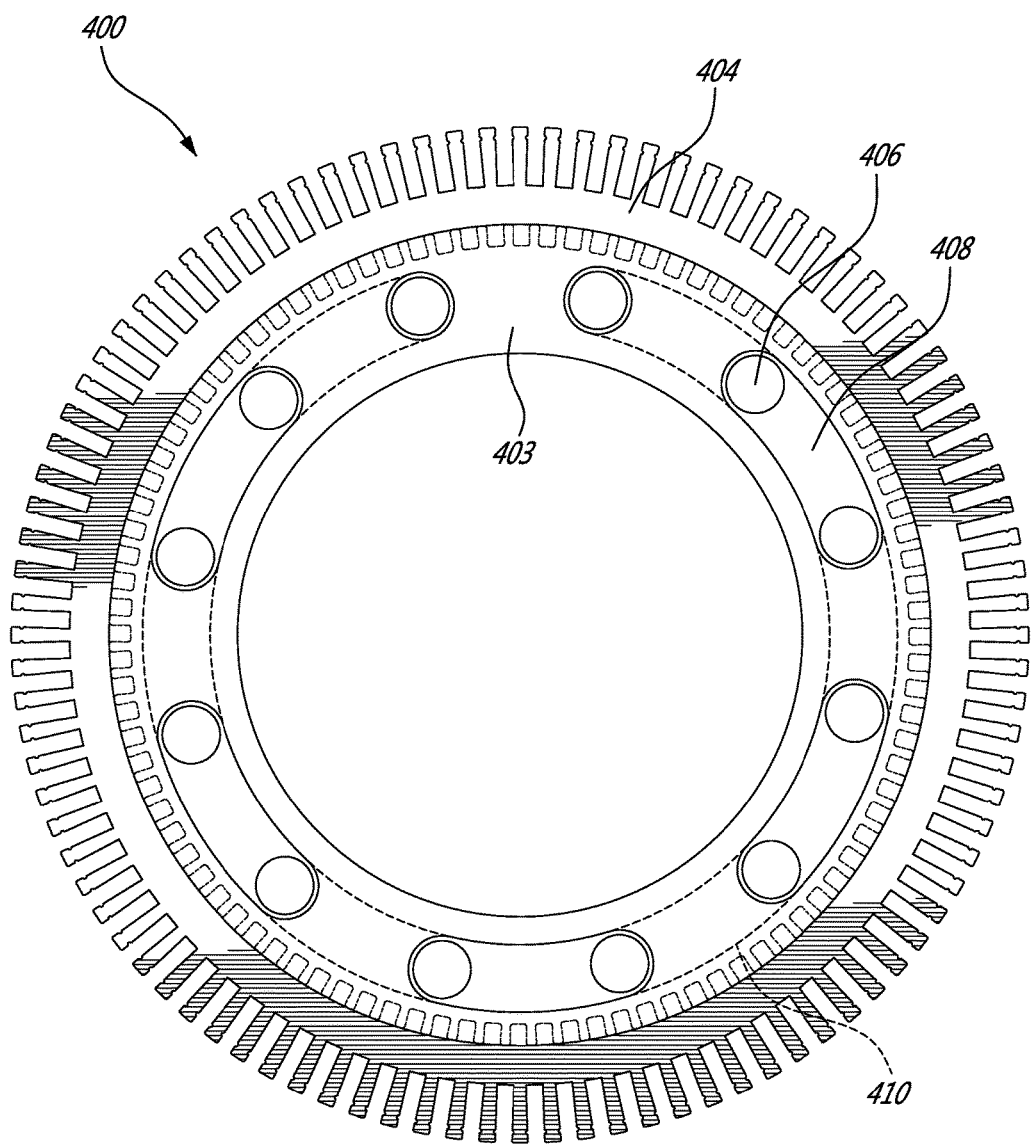
FIG. 12 is a top plan view of stator of FIG. 11, after the machining operations.

FIG. 12 illustrates the machining done to the cast heat-storing element 403. This machining includes the drilling of longitudinal conduits 406 that go through the entire thickness of the heat-storing element 403, and the milling of recesses 408 that interconnect adjacent longitudinal conduits 406. As can be seen from the dashed lines of this figure, the recesses 410 provided on the second longitudinal end of the cooling arrangement, are so positioned as to interconnect different longitudinal conduits 406 than the recesses 408.

Figure 13:
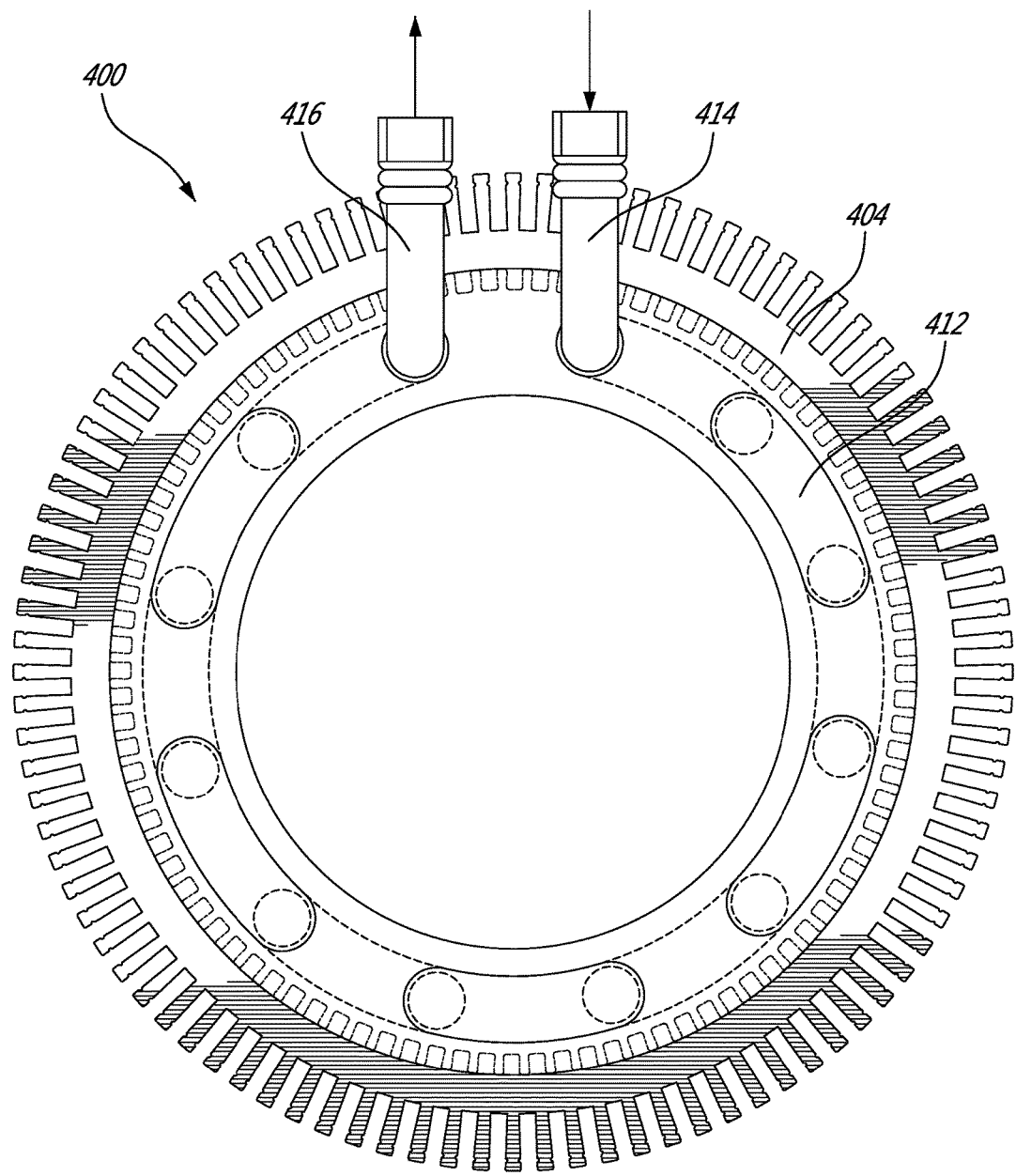
FIG. 13 is a top plan view of the stator of FIG. 11, after the inlet, outlet and covers have been mounted thereto.

FIG. 13 shows covers 412 fitted in the recesses 408 and inlet and outlet 414 and 416 fitted to predetermined conduits 406. One skilled in the art will easily understand that the covers 412 positioned in the recesses 408 and 410 create a continuous cooling path between the inlet and outlet.

Figure 14:
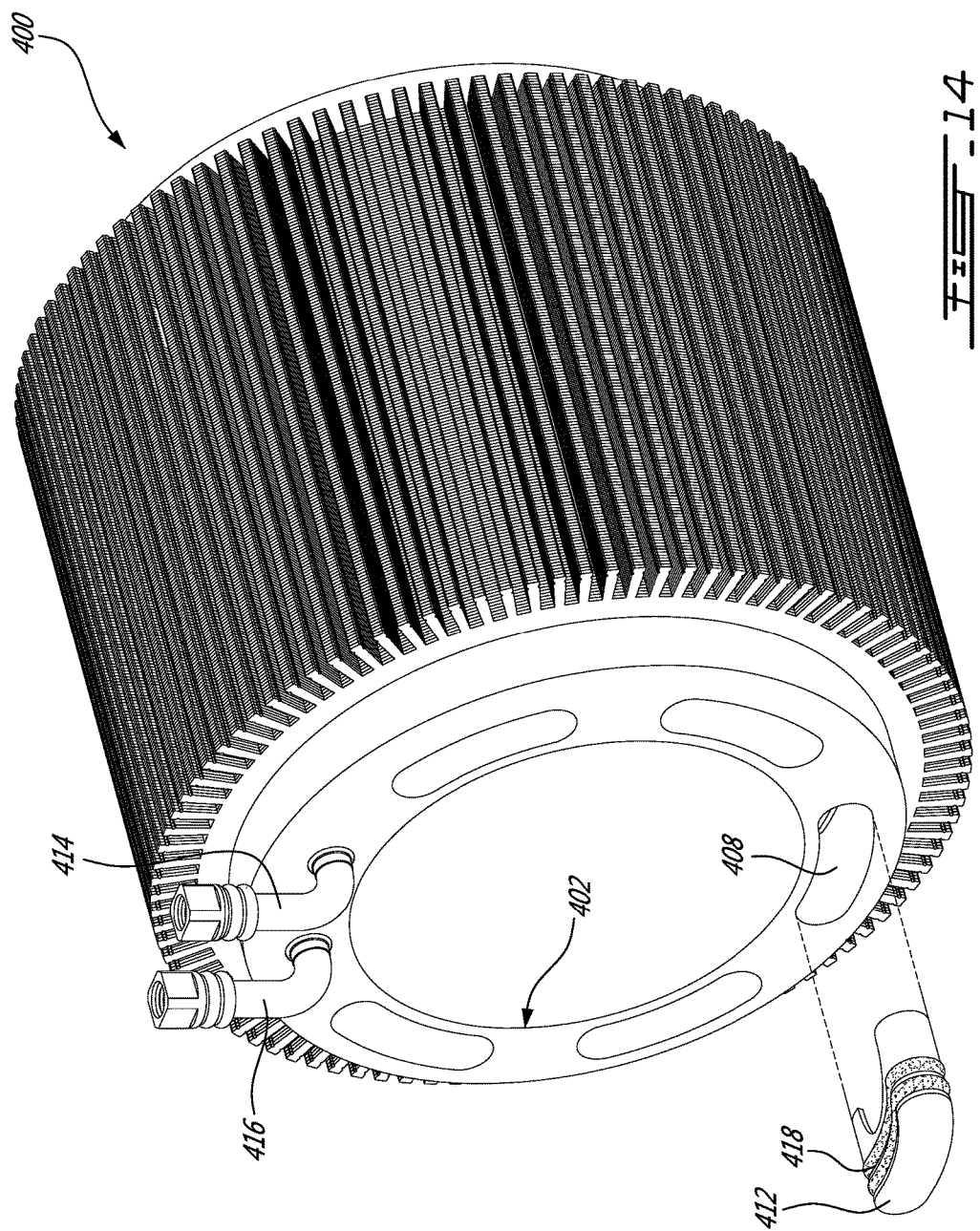
FIG. 14 is a perspective view of the stator of FIG. 11.

FIG. 14 is a partially exploded view of the assembled stator 400. One cover 412 is shown before its insertion into the recess 408. As can be seen from this figure, O-rings 418 are present to create a seal between the cover 412 and the recess 408. Of course, mechanical and/or chemical means can be used to securely mount the covers 412 to the recesses 408 and 410.

Figure 15:
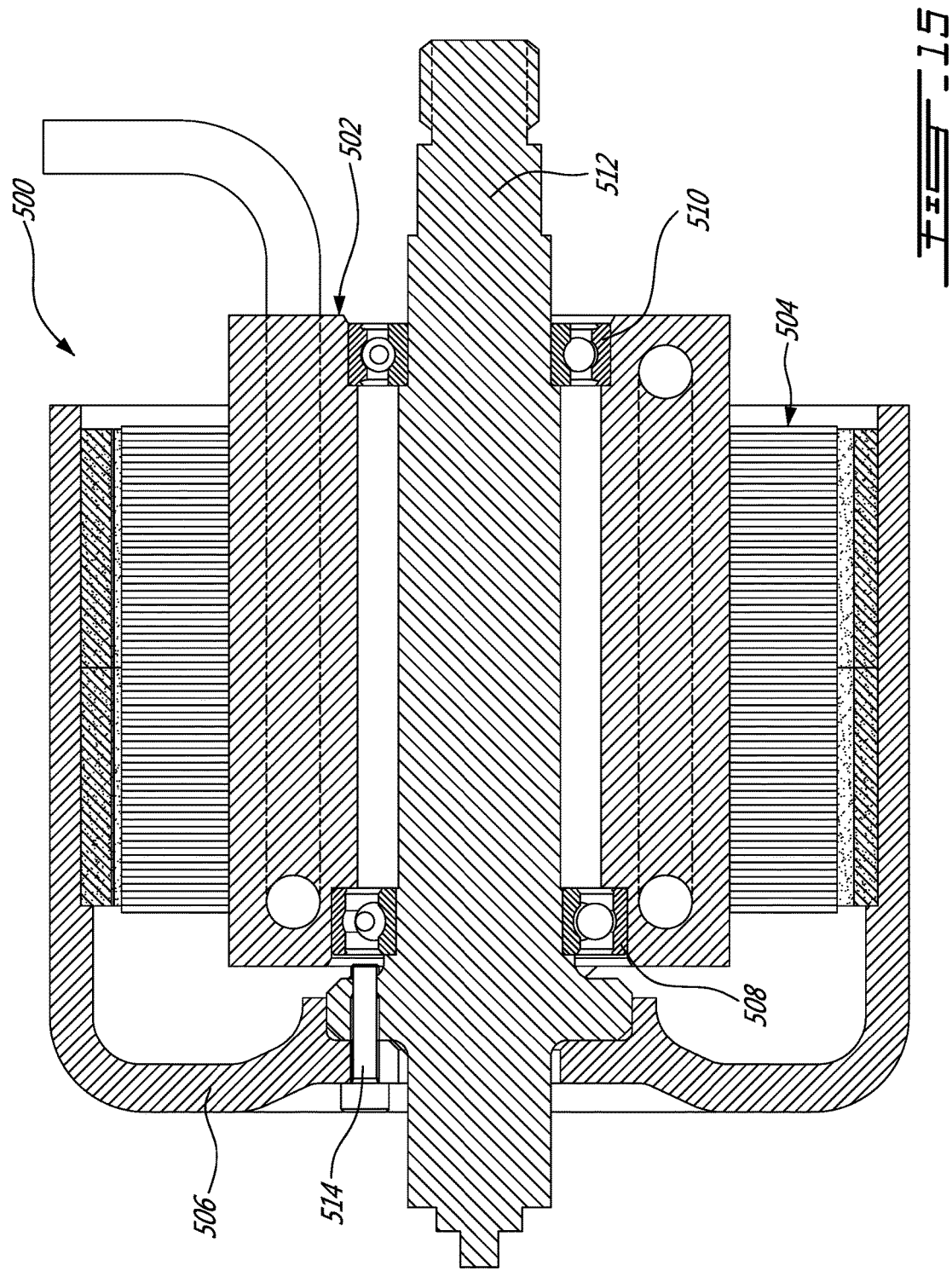
FIG. 15 is a sectional view of an electric machine including a stator according to a sixth illustrative embodiment.

Turning now to FIG. 15 of the appended drawings, an electric machine 500 provided with a cast cooling arrangement 502 according to a sixth illustrative embodiment will now be described. Since the electric machine 500 is similar to the electric machine 10 described hereinabove and illustrated in FIGS. 1 to 7, only the differences therebetween will be described hereinbelow for concision purpose.

The electric machine 500 includes an internal stator 504 and an external rotor 506.

While it is not apparent from this figure, the interconnection between the internal stator 504 and the cooling arrangement 502 is done via longitudinal channels as shown in other embodiments.

In this embodiment, the cooling arrangement 502 is machined to receive bearings 508 and 510 so configured as to receive a shaft 512 mounted to the rotor 506 via fasteners 514 (only one shown).

It is to be noted that the coils have been omitted from the electric machine 500 of FIG. 15 for clarity purpose.

Figure 16:
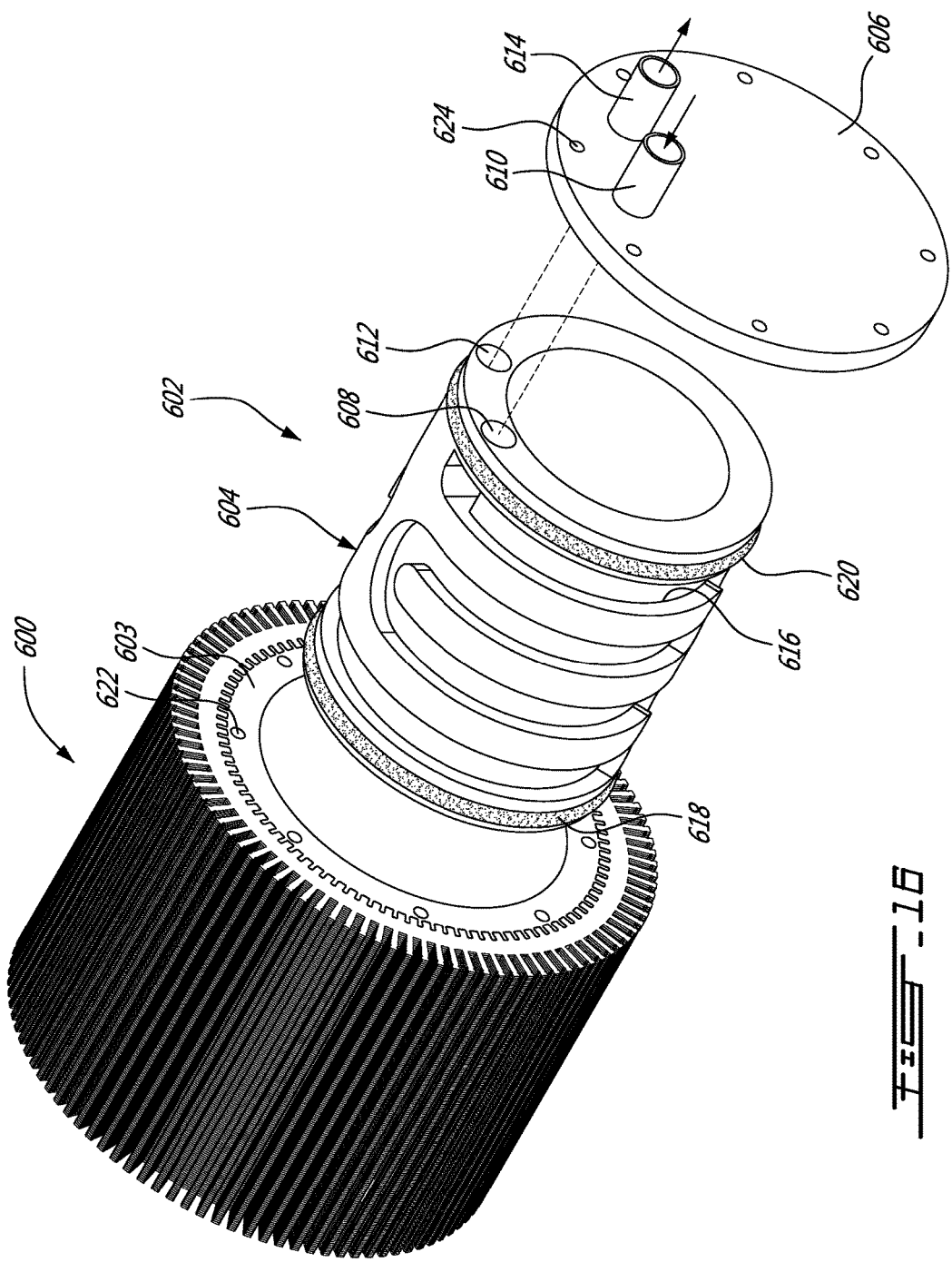
FIG. 16 is an exploded perspective view of a stator according to a seventh illustrative embodiment.
Figure 17:
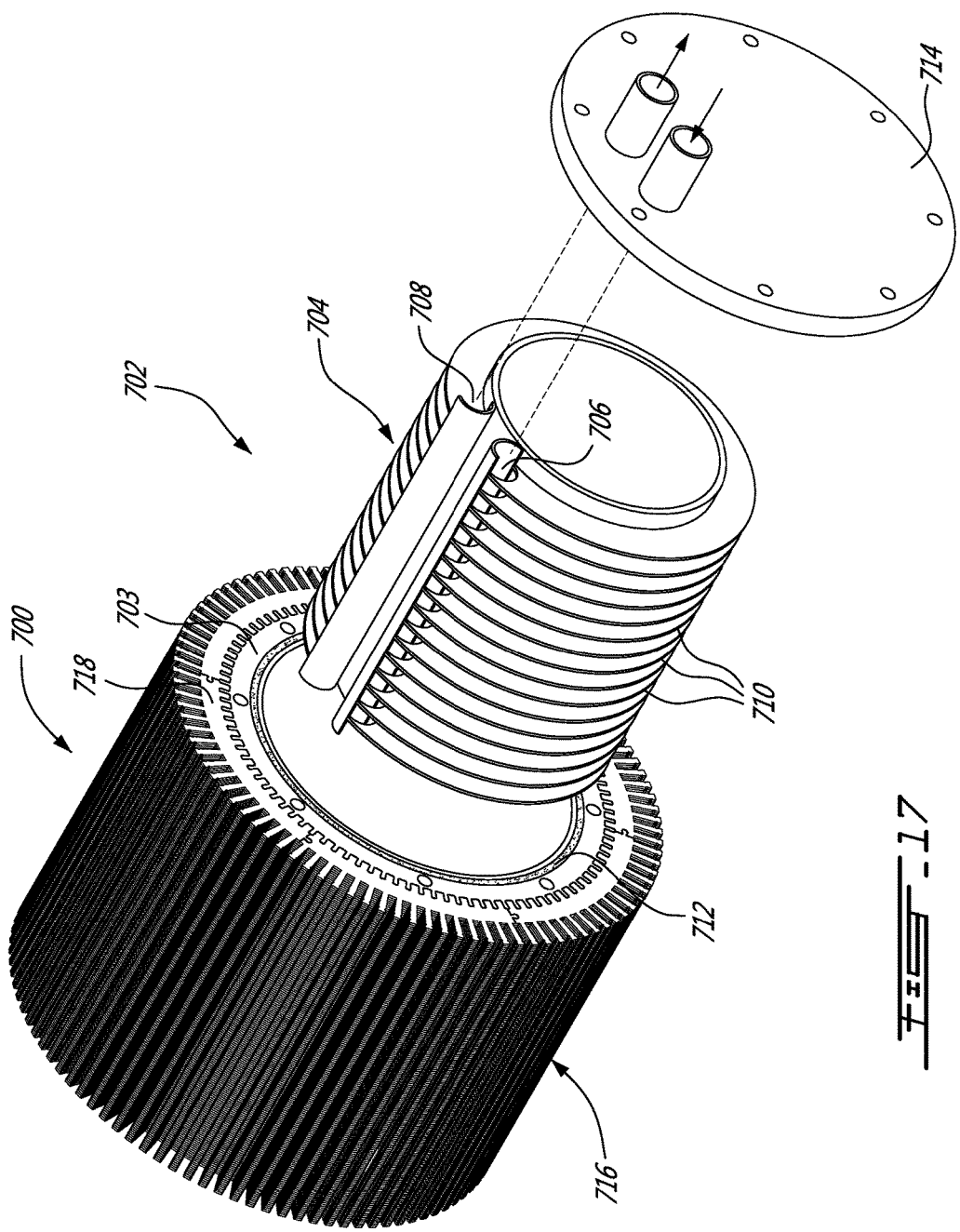
FIG. 17 is an exploded perspective view of a stator according to an eighth illustrative embodiment.

Turning now to FIG. 16 of the appended drawings, a stator 600 provided with a cast cooling arrangement 602 according to a seventh illustrative embodiment will now be described.

In the exploded perspective view of FIG. 16, it is apparent that the cast cooling arrangement 602 includes a cast heat-storing element 603, an insert 604 and a cover 606.

The cast heat-storing element 603 includes a bottom (not shown) and has a diameter such that the insert 604 slides snugly therein.

The insert 604 is generally cylindrical and includes an inlet 608 connected to an inlet coupling 610 provided on the cover 606 and an outlet 612 connected to an outlet coupling 614 of the cover 606. A continuous cooling channel 616 is provided on the outer surface of the insert 604. This channel is in fluid communication with the inlet 608 and outlet 612. Top and bottom O-rings 618 and 620 provide a seal between the insert and the inner surface of the cooling arrangement 602.

The heat-storing element 603 is also provided with threaded apertures 622 corresponding to the apertures 624 of the cover 606 allowing the cover to be mounted to the cooling arrangement 602. Of course, mechanical and/or chemical means can be used to securely mount the cover 606 to the heat-storing element 603.

Accordingly, when the cooling arrangement is assembled with the insert 604 and the cover 606, a continuous cooling fluid path is created between the inlet 610 and the outlet 614. Since the cooling fluid passing therethrough comes in direct contact with the internal surface of the cast heat-storing element 603, an efficient cooling of the stator 600 takes place.

One skilled in the art will readily understand that the insert 604 can be molded from plastic or other materials as long as the material is stable at the relatively high temperatures to which the cast cooling arrangement is subjected.

Turning now to FIGS. 17 to 22 of the appended drawings, a stator 700 provided with a cast cooling arrangement 702 according to a eighth illustrative embodiment will now be described. Since the stator 700 is similar to the stator 600 described hereinabove and illustrated in FIGS. 16, only the differences therebetween will be described hereinbelow for concision purpose.

Two main differences exist between the stator 700 and the stator 600 of FIG. 16. First, the configuration of the insert 704 is different from the configuration of the insert 604 and second, the stator core 716 is a segmented stator, i.e. that it is made of segmented laminations.

More specifically, the insert 704 includes a generally cylindrical inlet manifold 706 and a generally cylindrical outlet manifold 708. A number of partition walls 710 interconnect the two manifolds and allow cooling fluid to flow therebetween. The outer diameter of the partition walls is such that the insert 704 fits snugly in the cast heat-storing element.

An O-ring 712 is fitted in a circumferential channel of the heat-storing element 703 to seal the interconnection between the cooling arrangement and the cover 714.

The stator core 716 is segmented, i.e. that each lamination stacked together to form the stator core 16 is made of six identical lamination segment 718.

Figure 18:
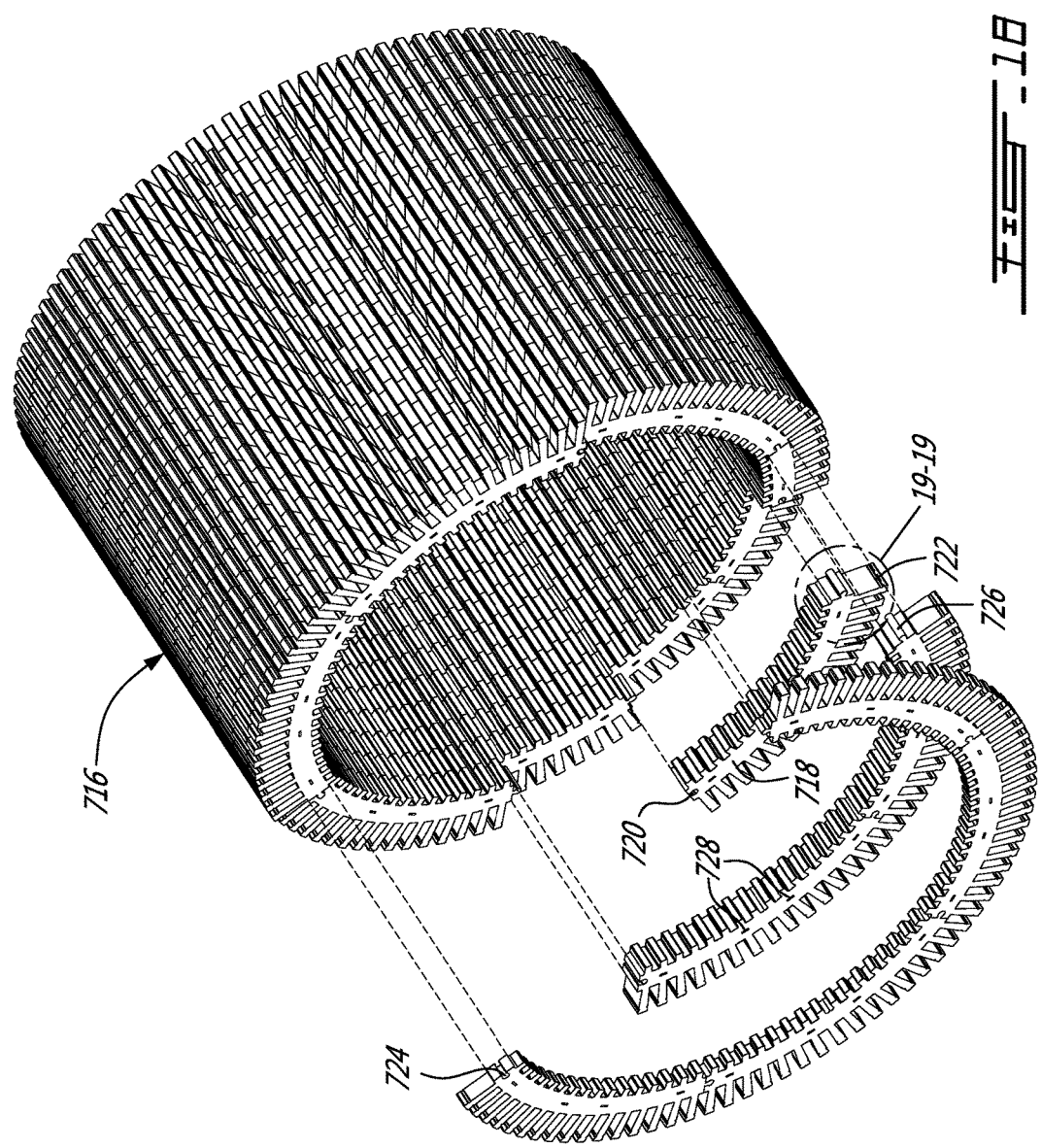
FIG. 18 is a partially exploded perspective view of the stator core of the stator of FIG. 17.

FIG. 18 shows a partially exploded perspective view of the stator core 16. As can be seen from this figure, each lamination segment 718 includes first and second ends 720, 722 including complementary interconnecting elements. In the illustrated example, the first end 720 includes a recess 724 while the second end 722 includes a corresponding projection 726. Of course, other complementary interconnection elements could be used.

FIG. 18 also illustrates that, prior to being interconnected to form a circular lamination, the lamination segments 718 are first stacked and secured together using a localized deformation 728.

Figure 19:
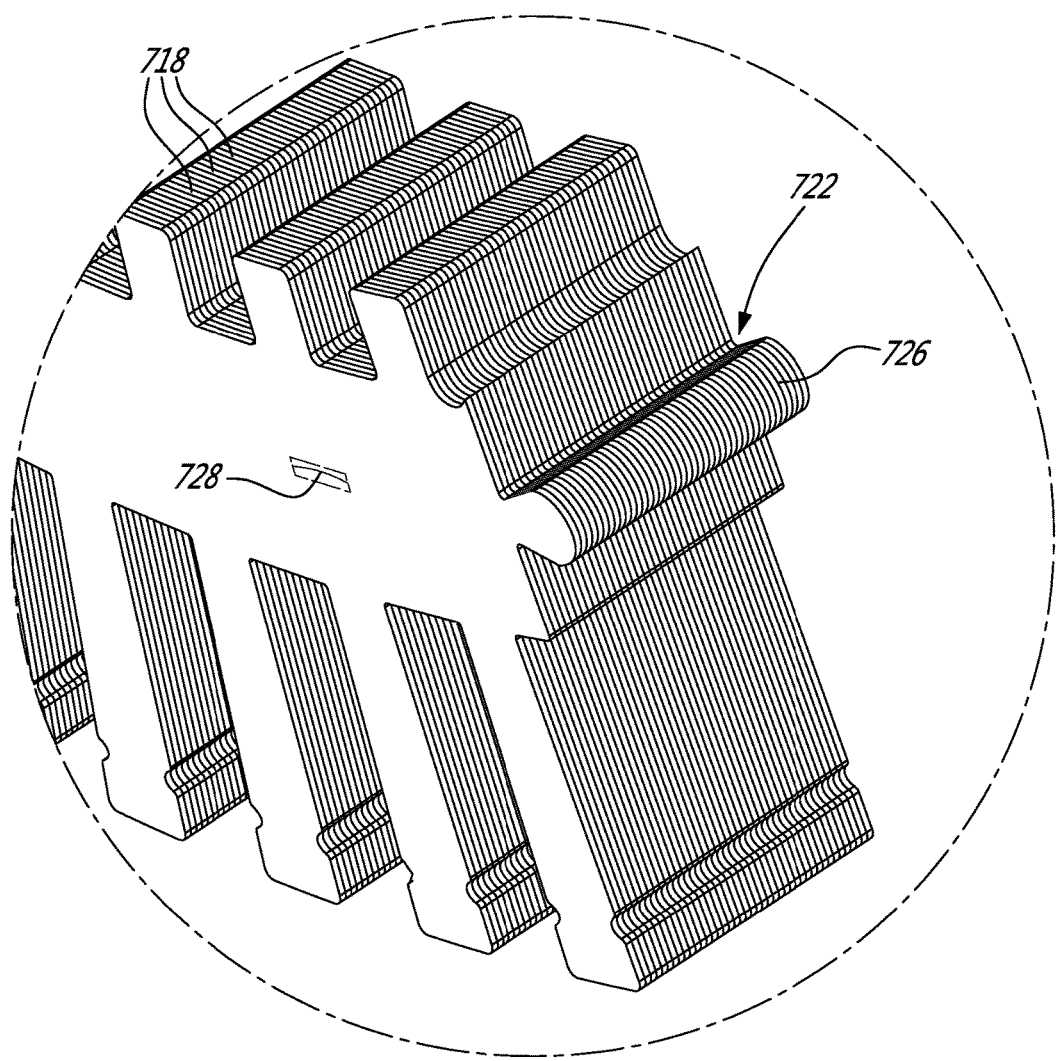
FIG. 19 illustrates an enlarged portion of a stack of laminations taken along line 19-19 of FIG. 18.

FIG. 19, which is an enlarged portion of FIG. 18, better illustrates the end 722 of a stack of lamination segments 718.

Six stacks of lamination segments 718 are therefore required to form a ring having a predetermined thickness.

Returning briefly to FIG. 18 of the appended drawings, one can appreciate that the axially adjacent rings are so mounted to one another as to be offset so that the interconnections between the segments are staggered from one ring to the next. In the illustrated example, the offset is 30 degrees.

Figure 20:
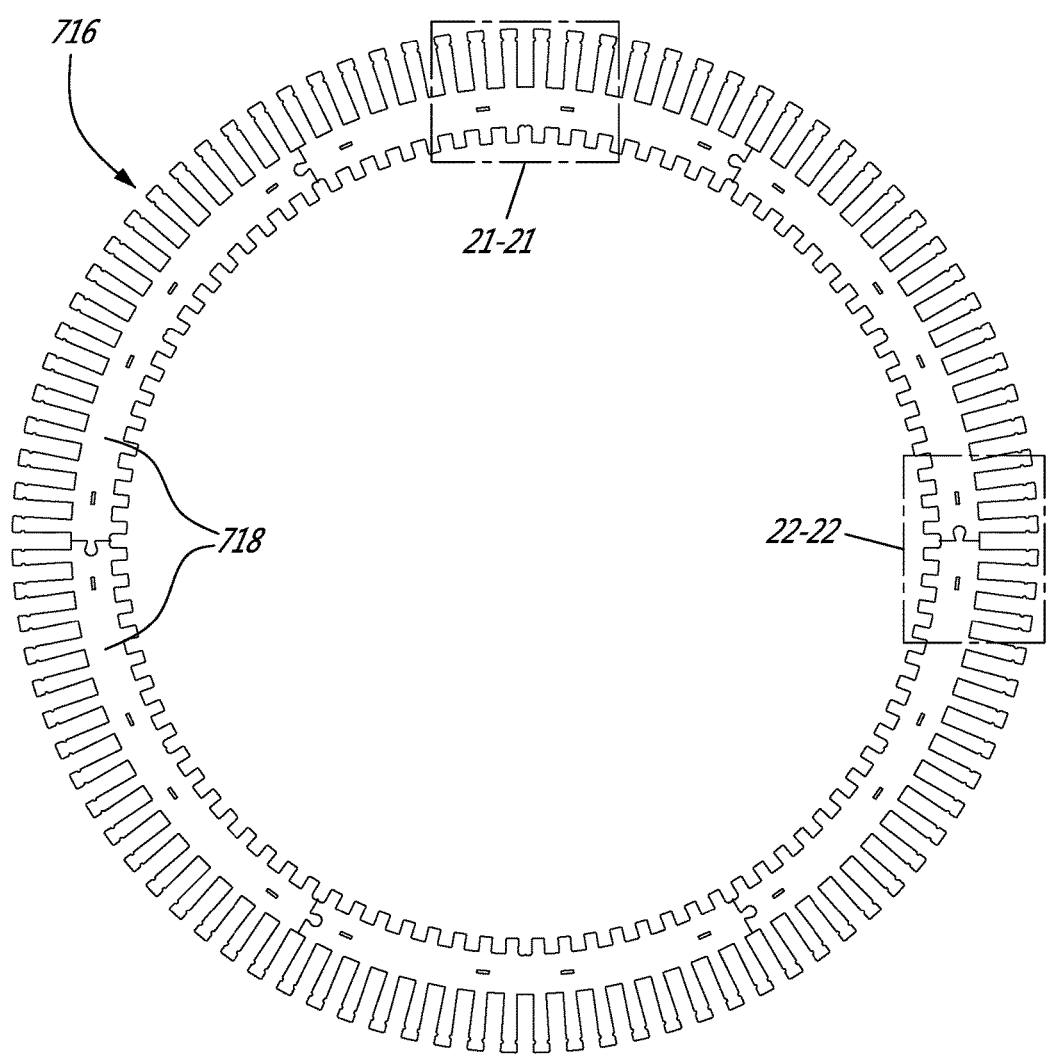
FIG. 20 is a top plan vide of the stator core of FIG. 18.

FIG. 20 illustrates a top plan view of the stator core 716 before the heat-storing element is cast therein.

Figure 21:
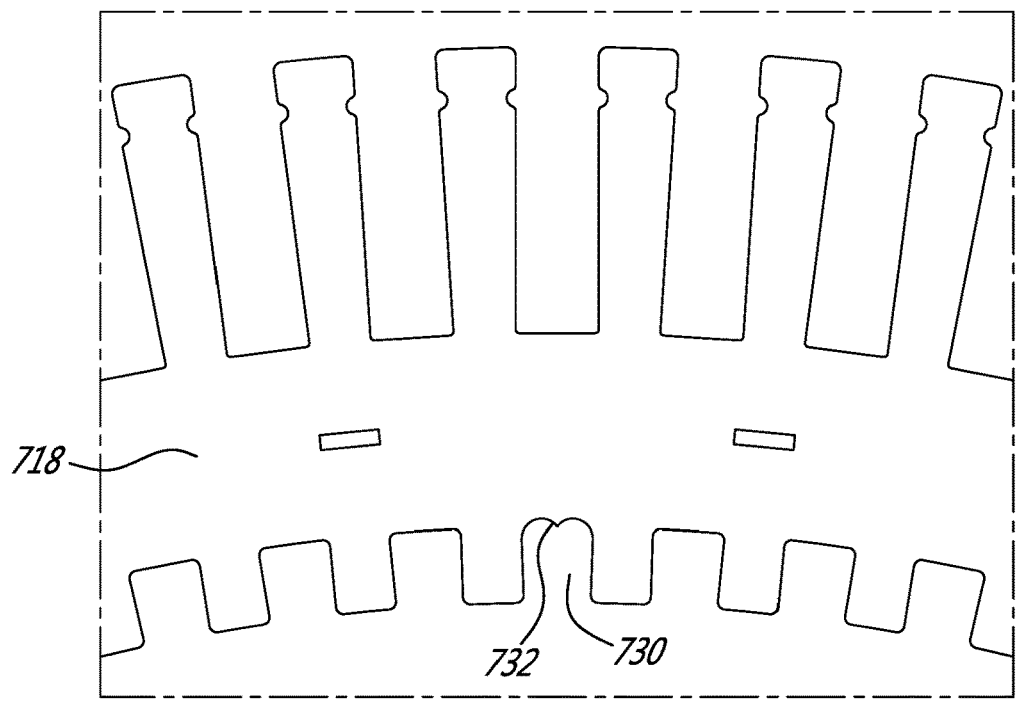
FIG. 21 is an enlarged portion taken along line 21-21 of FIG. 20.
Figure 22:
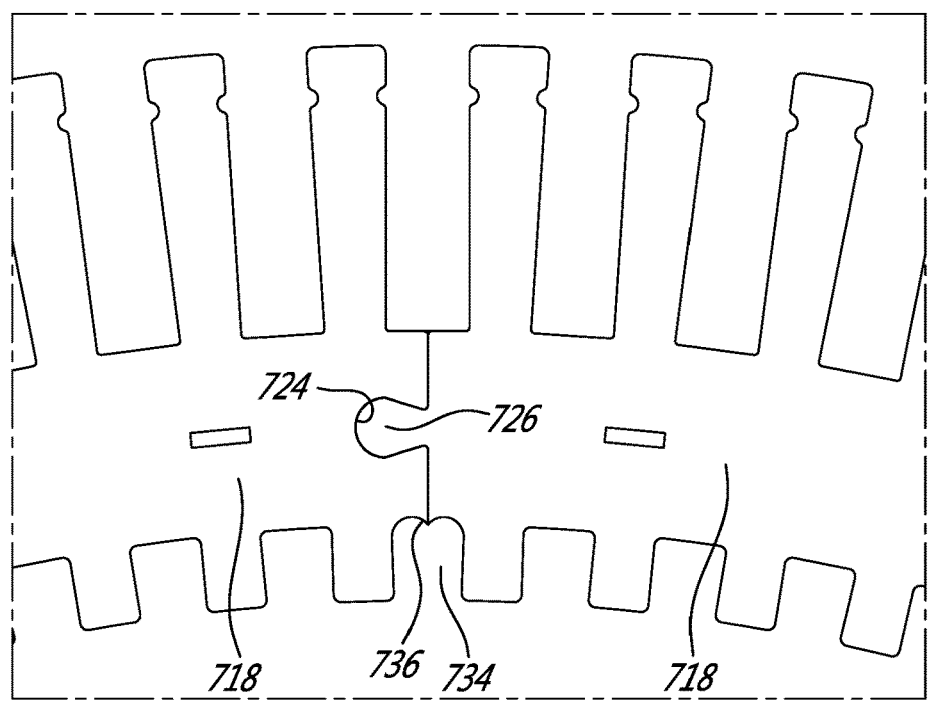
FIG. 22 is an enlarged portion taken along line 22-22 of FIG. 20.

FIGS. 21 and 22 are enlargements of portions of the stator core 716. One can see from FIG. 21 that the central longitudinal channel 730 of each lamination segment 718 is different from the other longitudinal channels as it includes a central bulge 732. Similarly, from FIG. 22, the longitudinal channel 734 formed at the junction of two adjacent lamination segments also includes a central bulge 736.

These central bulges 732 and 736 provide excess material that allows the stator core 716 to be welded once it is assembled. This welding operation holds the stator core together and decreases the amount of spilled material when the heat-storing element is cast therein. Indeed, since there is a weld at the junction of the adjacent lamination segments 718, less material can flow through.

It is also to be noted that the contraction of the heat-storing element 703 during the cooling portion of its formation in the segmented stator core 716 may be viewed as a pulling action of the heat-storing element 703 towards the center of the segmented stator core 716. This pulling action helps to maintain the contact between adjacent lamination segments 718 since it pulls these segments inwardly.

One skilled in the art will understand that while six segments are required to make a lamination in FIGS. 17 to 22, this number could be different.

Figure 23:
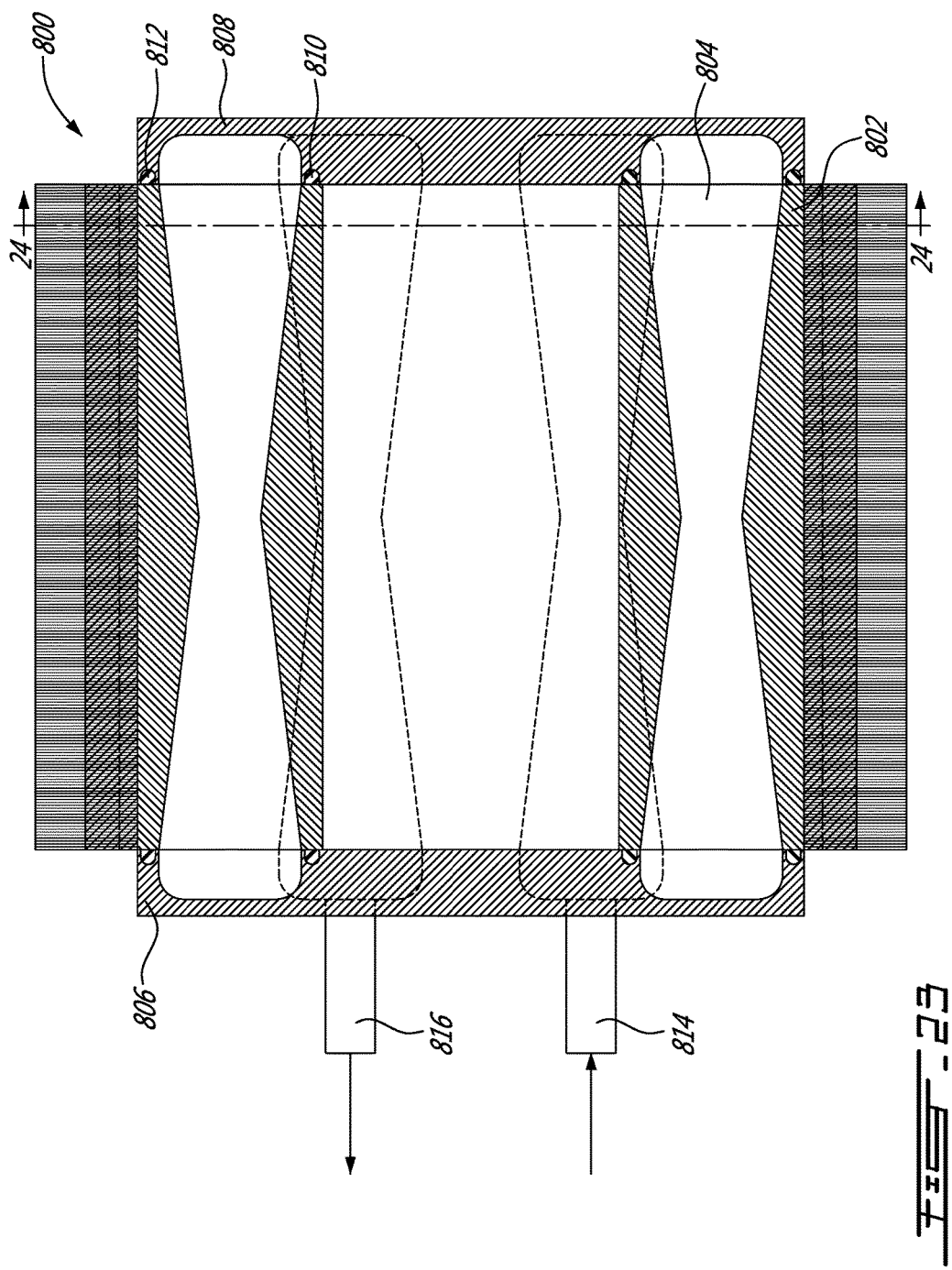
FIG. 23 is a sectional side elevation view of a stator according to a ninth illustrative embodiment.
Figure 24:
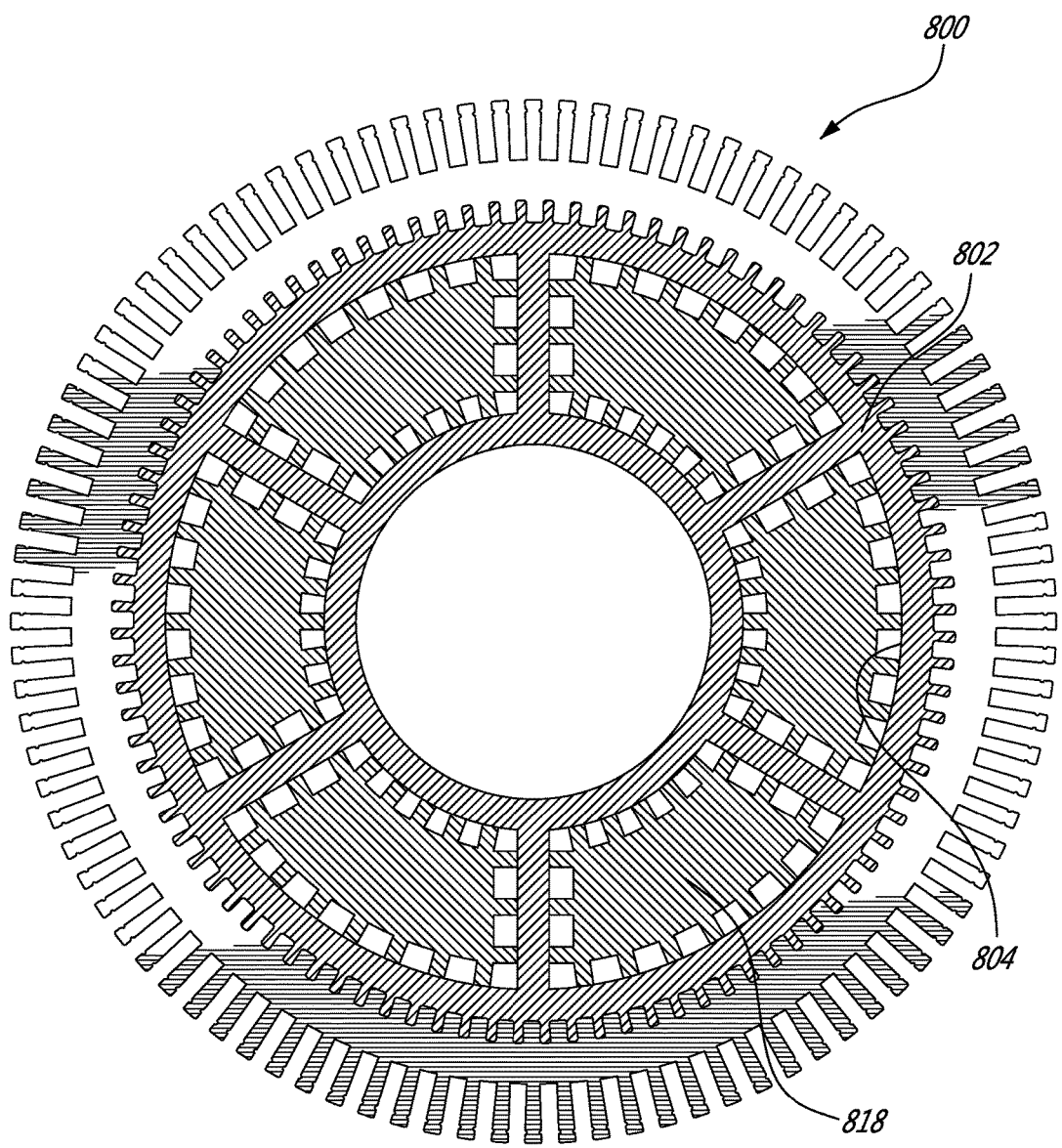
FIG. 24 is a sectional view taken along line 24-24 of FIG. 23.

Turning now to FIGS. 23 and 24 of the appended drawings, a stator 800 provided with a cast cooling arrangement 802 according to a ninth illustrative embodiment will now be described.

FIG. 23 illustrates the stator in a sectional view and shows that the cast cooling arrangement 802 was made with removable tapered core (not shown) that create the double-tapered longitudinal conduits 804.

Covers 806 and 808, provided with respective inner and outer O-rings 810, 812 are mounted to the opposite longitudinal ends of the cooling arrangement and are so designed as to interconnect adjacent conduits 804 so as to create a continuous cooling fluid path between an inlet 814 and an outlet 816 of cover 806

FIG. 24, which is a sectional view taken along line 24-24 of FIG. 23, illustrate inserts 818 that are inserted in the conduits 804 to decrease the amount of cooling fluid in the conduits 804 and to keep the cooling fluid in contact with the walls of the conduits.

One skilled in the art will readily understand that the insert 818 can be molded from plastic or other materials as long as the material is stable at the relatively high temperatures to which the cast cooling arrangement is subjected.

One skilled in the art will be in a position to modify the shape of the inserts 818.

It is to be noted that the inserts 818 are not illustrated in FIG. 18, for clarity purpose.

Figure 25:
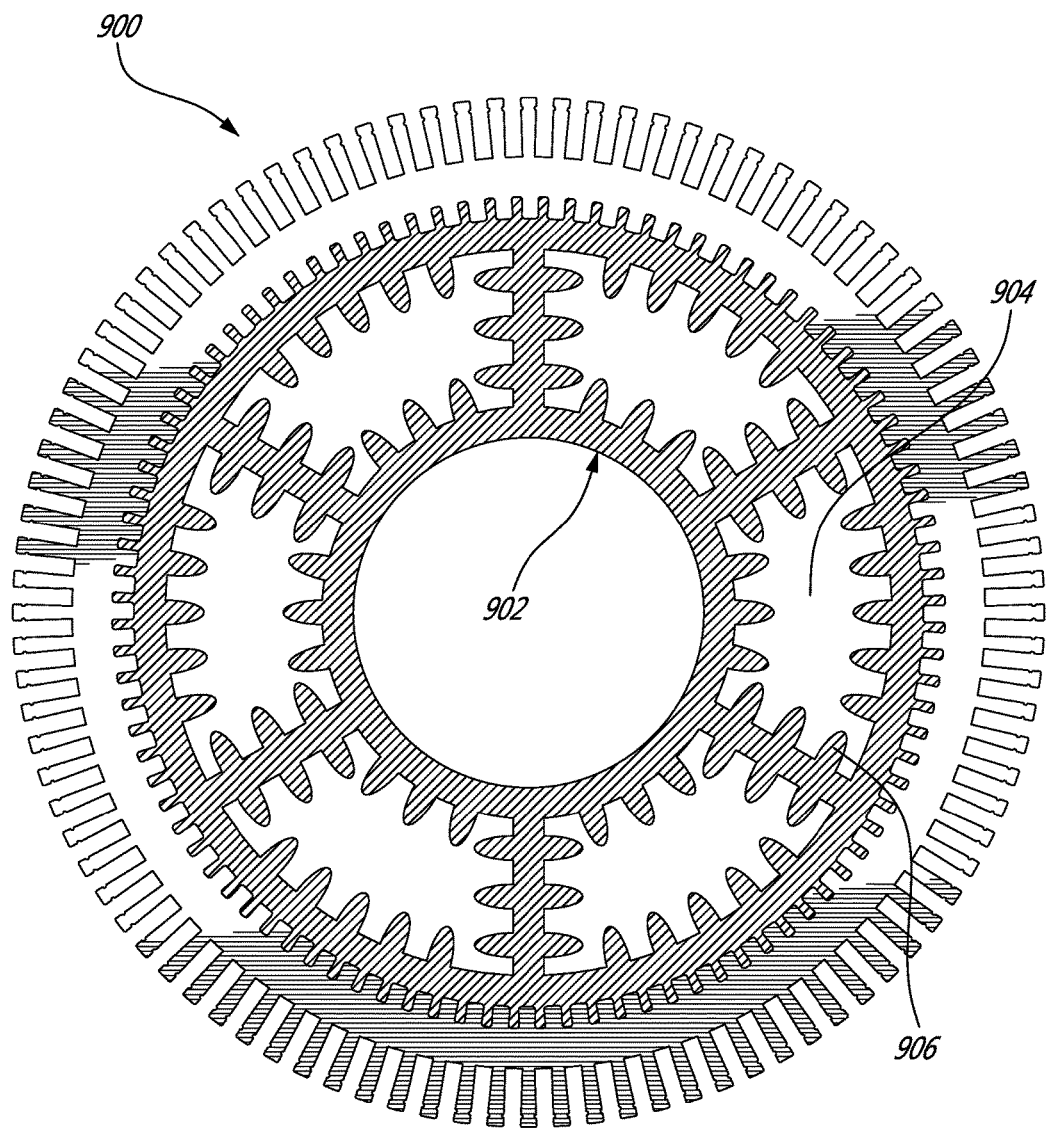
FIG. 25 is a sectional view similar to FIG. 24 but illustrating a tenth illustrative embodiment.

Turning now to FIG. 25 of the appended drawings, a stator 900 provided with a cast cooling arrangement 902 according to a tenth illustrative embodiment will now be described. Since the stator 900 is similar to the stator 800 described hereinabove and illustrated in FIGS. 23 and 124, only the differences therebetween will be described hereinbelow for concision purpose.

As can be seen from this figure, the inner walls of the double tapered conduits 904 include projections 906 increasing the contact area between the cooling arrangement and the cooling fluid flowing therethrough.

One skilled in the art can modify the number and the shape of the projections 906.

Figure 26:
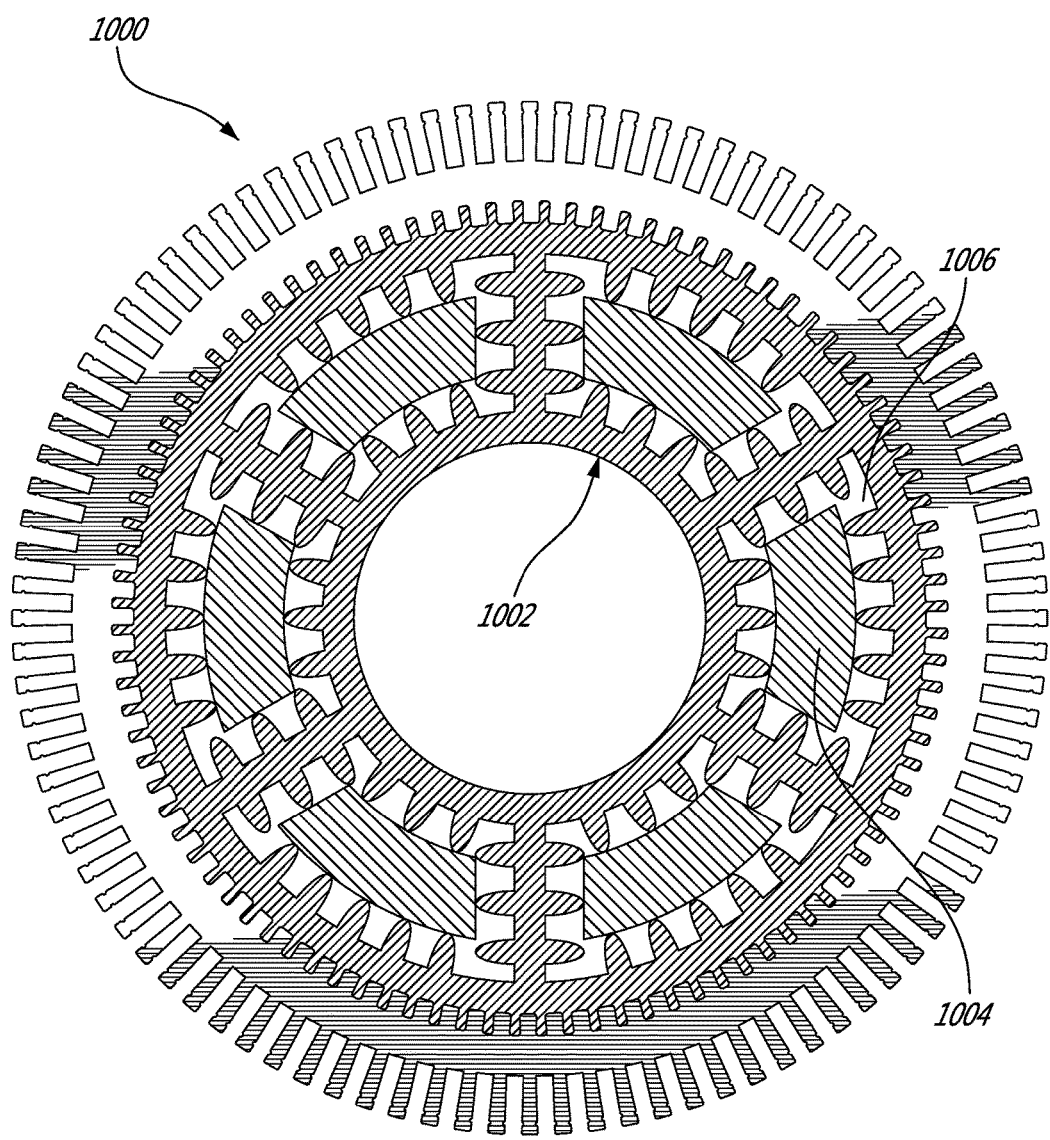
FIG. 26 is a sectional view similar to FIG. 25 but illustrating a eleventh illustrative embodiment.

Turning now to FIG. 26 of the appended drawings, a stator 1000 provided with a cast cooling arrangement 1002 according to a eleventh illustrative embodiment will now be described. Since the stator 1000 is similar to the stator 900 described hereinabove and illustrated in FIG. 25, only the differences therebetween will be described hereinbelow for concision purpose.

In FIG. 26, inserts 1004 have been inserted in the double tapered conduits 1006 to decrease the amount of cooling fluid in the conduits 1006 and to keep the cooling fluid in contact with the walls of the conduits.

One skilled in the art will readily understand that the insert 1004 can be molded from plastic or other materials as long as the material is stable at the relatively high temperatures to which the cast cooling arrangement is subjected to.

Figure 27:
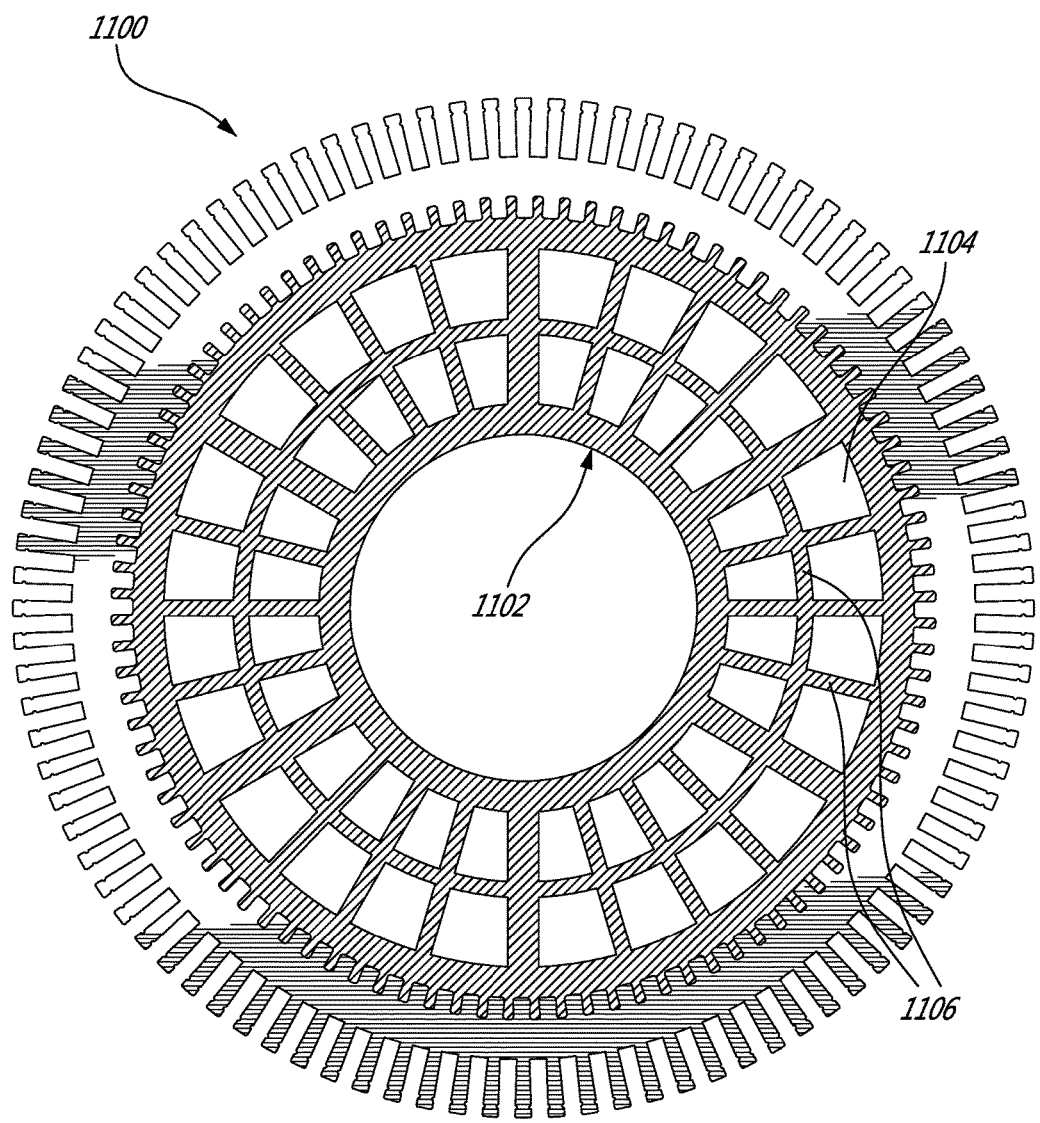
FIG. 27 is a sectional view similar to FIG. 24 but illustrating a twelfth illustrative embodiment.

Turning now to FIG. 27 of the appended drawings, a stator 1100 provided with a cast cooling arrangement 1102 according to a twelfth illustrative embodiment will now be described. Since the stator 1100 is similar to the stator 900 described hereinabove and illustrated in FIG. 25, only the differences therebetween will be described hereinbelow for concision purpose.

In FIG. 27, the double-tapered conduits 1104 are divided in eight sections by intermediate walls 1106.

Finally, turning now to FIG. 28 of the appended drawings, a stator 1200 provided with a cast cooling arrangement 1202 according to a thirteenth illustrative embodiment will now be described. Since the stator 1200 is similar to the stator 800 described hereinabove and illustrated in FIG. 23, only the differences therebetween will be described hereinbelow for concision purpose.

Generally stated the difference between the cast cooling arrangement 1202 and the cast cooling arrangement 802 concerns the covers and the inlet and outlet.

Indeed, in the arrangement 1202, the covers 1204 and 1206 define manifolds interconnecting all the double-tapered conduits 1208. Accordingly, the cover 1204 includes the inlet 1210 and the cover 1206 includes the outlet 1212.

One skilled in the art will understand that the electric machines are schematically illustrated in the appended figures and that other elements such as an enclosure and bearings, are required for the machines to operate properly.

It is to be noted that while a stack of laminations have been described herein as forming the stator core, other technologies, such as metallic powders, could be used to form the stator core.

One skilled in the art will understand that the number and size of the longitudinal internal channels as well as the tapering angle of the lateral walls of these channels can be different than illustrated herein depending on the size, power and other features of the electric machine.

One skilled in the art will understand that the mold used to cast the cooling arrangement could be different than the mold that is schematically illustrated and described herein.

The above disclosure describes many embodiments. It is to be understood that the various features of these embodiments can be combined differently than illustrated and described herein.

It is to be understood that the cast cooling arrangement for electric machines is not limited in its application to the details of construction and parts illustrated in the accompanying drawings and described hereinabove. The cast cooling arrangement for electric machines is capable of other embodiments and of being practiced in various ways. It is also to be understood that the phraseology or terminology used herein is for the purpose of description and not limitation. Hence, although the cast cooling arrangement for electric machines has been described hereinabove by way of illustrative embodiments thereof, it can be modified, without departing from the spirit, scope and nature of the subject invention as defined in the appended claims.

What is claimed is:

1. A cooling arrangement cast into a generally cylindrical stator having longitudinal channels provided on an internal surface thereof; the cooling arrangement comprising a cast heat-storing element and conduits defining a cooling path having an inlet and an outlet, the cast heat-storing element comprising longitudinal teeth received by the longitudinal channels.

2. The cooling arrangement as recited in claim 1, wherein the longitudinal channels of the stator and the longitudinal teeth of the cast heat-storing element have corresponding dovetail shapes.

3. The cooling arrangement as recited in claim 1, wherein the cast heat-storing includes a material selected from the group consisting of aluminium, aluminium alloys, copper, non-ferrous materials and thermally conductive polymers.

4. The cooling arrangement as recited in claim 1, wherein the cooling path is defined by a continuous serpentine conduit.

5. The cooling arrangement as recited in claim 1, wherein the cooling path is defined by longitudinal conduits and by shaped covers provided at opposed longitudinal ends of the cast cooling arrangement.

6. The cooling arrangement as recited in claim 5, wherein each cover includes sealing means.

7. The cooling arrangement as recited in claim 5 wherein the covers are so configured as to interconnect adjacent longitudinal conduits.

8. The cooling arrangement as recited in claim 5 wherein the covers are so configured as to define respective manifolds that interconnect all the longitudinal conduits.

9. The cooling arrangement as recited in claim 5, wherein the longitudinal conduits are formed during the casting of the cast heat-storing element.

10. The cooling arrangement as recited in claim 1, wherein the conduits are longitudinal and are machined in the cast cooling arrangement; the cooling arrangement having opposite longitudinal ends machined to define recesses open to adjacent longitudinal conduits; the cooling arrangement further comprising covers insertable into the recesses to complete a cooling path.

11. The cooling arrangement as recited in claim 1, wherein an inner surface of the heat-storing element is machined to receive bearings so as to allow a rotatable shaft to rotate therein.

12. The cooling arrangement as recited in claim 1, wherein the cast heat-storing element further includes an internal surface and a bottom surface, and wherein the cooling arrangement further includes a removable cover and an insert so configured and sized as to be inserted in the heat-storing element.

13. The cooling arrangement as recited in claim 12, wherein the insert includes an outer surface provided with channels defining a cooling path.

14. The cooling arrangement as recited in claim 1, wherein the conduits are longitudinal and are double-tapered.

15. The cooling arrangement as recited in claim 1, wherein for each longitudinal channel and longitudinal tooth received therein, a gap is formed between a bottom side of the longitudinal channel and a top side of the longitudinal tooth.

16. The cooling arrangement as recited in claim 1, wherein the longitudinal conduits are formed during the casting of the cast heat-storing element.

17. An electric machine comprising:
an internal stator having an internal surface provided with longitudinal channels;
an external rotor coaxially mounted about the internal stator; and
a cooling arrangement cast in the internal stator, the cooling arrangement comprising a cast heat-storing element and conduits defining a cooling path having an inlet and an outlet, the cast heat-storing element comprising teeth received by the longitudinal channels.

18. The electric machine as recited in claim 17, wherein the longitudinal channels of the stator are dovetail shape.

19. The electric machine as recited in claim 17, wherein all the longitudinal channels are identical.

20. The electric machine as recited in claim 17, wherein depths of the longitudinal channels vary.

21. The electric machine as recited in claim 17, wherein the cast heat-storing element includes material selected from the group consisting of aluminium, aluminium alloys, copper, non-ferrous materials and thermally conductive polymers.

22. The electric machine as recited in claim 17, wherein the cooling path is defined by a continuous serpentine conduit.

23. The electric machine as recited in claim 17, wherein the cooling path is defined by longitudinal conduits and by shaped covers provided at longitudinal ends of the cast cooling arrangement.

24. The electric machine of claim 23, wherein each cover includes sealing means.

25. The electric machine as recited in claim 17, wherein the internal stator includes a segmented stator core.

26. The electric machine as recited in claim 25, wherein the segmented stator core includes a plurality of stacked stator laminations each made of laminations segments assembled end to end.

27. The electric machine as recited in claim 26, wherein each stator lamination is made of six lamination segments.

28. The electric machine as recited in claim 25, wherein the segmented stator core includes lamination segments that are stacked together to form lamination segment stacks and assembled end to end to form lamination rings; axially adjacent lamination rings are angularly offset so as to stagger the junction between the lamination segment stacks.

29. A method of forming a stator provided with a cast cooling arrangement comprising:
providing a generally cylindrical stator core having an internal surface provided with longitudinal channels;
placing the stator core into a mold having an internal wall and a bottom wall; the mold defining a chamber between the internal wall, the bottom wall and the internal surface of the generally cylindrical stator core;
providing a cooling conduit;
placing the cooling conduit in the chamber; and
casting a heat-conducting material into the chamber.

30. A method of forming a stator provided with a cast cooling arrangement comprising:
providing a plurality of lamination segments provided with longitudinal channels;
stacking the lamination segments into lamination segment stacks;
assembling lamination segment stacks end to end to form lamination rings where the longitudinal channels are internally facing;
forming a segmented stator core by stacking lamination rings so that axially adjacent lamination rings have the junctions between lamination segment stacks angularly offset;
placing the segmented stator core into a mold having an internal wall and a bottom wall; the mold defining a chamber between the internal wall, the bottom wall and the internal surface of the generally cylindrical stator core;
providing a cooling conduit;
placing the cooling conduit in the chamber; and
casting a heat-conducting material into the chamber.

* * * * *